(12) United States Patent
Yamazaki et al.

(10) Patent No.: US 10,596,973 B2
(45) Date of Patent: Mar. 24, 2020

(54) DOUBLE OPENING STORAGE DEVICE

(71) Applicant: TOYODA GOSEI CO., LTD., Kiyosu-shi, Aichi-ken (JP)

(72) Inventors: Kunio Yamazaki, Kiyosu (JP); Junichi Fujita, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 26 days.

(21) Appl. No.: 16/159,863

(22) Filed: Oct. 15, 2018

(65) Prior Publication Data

US 2019/0126796 A1 May 2, 2019

(30) Foreign Application Priority Data

Oct. 26, 2017 (JP) ................... 2017-207644

(51) Int. Cl.
*B60R 7/04* (2006.01)
*E05D 11/10* (2006.01)
*E05D 15/50* (2006.01)

(52) U.S. Cl.
CPC ............ *B60R 7/04* (2013.01); *E05D 11/1014* (2013.01); *E05D 15/50* (2013.01); *E05Y 2201/686* (2013.01); *E05Y 2900/538* (2013.01)

(58) Field of Classification Search
CPC ....... B60R 7/04; E05D 15/50; E05D 11/1014; E05Y 2900/538; E05Y 2201/686
USPC .............................................. 296/24.34, 37.8
See application file for complete search history.

(56) References Cited

U.S. PATENT DOCUMENTS

| 5,931,336 A * | 8/1999 | Takeuchi ................. B60R 7/04 220/836 |
| 6,142,333 A * | 11/2000 | Sasamoto ................ B60R 7/04 220/264 |
| 9,676,340 B2 * | 6/2017 | Ankolikar ............. E05D 15/502 |
| 2014/0291372 A1* | 10/2014 | Smith ...................... B60R 7/04 224/539 |

FOREIGN PATENT DOCUMENTS

JP 2016-112979 A 6/2016

\* cited by examiner

*Primary Examiner* — Dennis H Pedder
(74) *Attorney, Agent, or Firm* — Posz Law Group, PLC

(57) ABSTRACT

An opening and closing mechanism of a double opening storage device including a box main body and a lid body includes a rod and an engagement hole corresponding to a first rotating shaft, a rod and an engagement hole corresponding to a second rotating shaft, first and second biasing members that engage the rods with the engagement holes, first and second operation units that displace the rods in an engagement-releasing direction by an opening operation, and a malfunction prevention device that prevents the opening operation of the first operation unit and the second operation unit from being performed at the same time. The malfunction prevention device includes a base member, first and second stoppers that are respectively rotatable around a first shaft and a second shaft with respect to the base member, and a spring member which is interposed between the first and second stoppers.

4 Claims, 11 Drawing Sheets

DOUBLE OPENING STORAGE DEVICE

CROSS-REFERENCE TO RELATED APPLICATION(S)

This application is based upon and claims the benefit of priority from Japanese Patent Application No. 2017-207644, filed on Oct. 26, 2017, the entire contents of which are incorporated herein by reference.

BACKGROUND

1. Field of the Invention

The present invention relates to a double opening storage device including a box main body, a lid body that covers an opening of the box main body, and an opening and closing mechanism that can open and close the lid body around each of two rotating shafts.

2. Description of the Related Art

In the related art, there is known a double opening storage device such as a console box disposed in a vehicle cabin (for example, JP-A-2016-112979). The double opening storage device includes a box main body, a lid body, and an opening and closing mechanism. The box main body includes a substantially rectangular parallelepiped accommodation unit provided with an opening on an upper surface. The lid body is a member that is formed in a thin rectangular shape that corresponds to the opening of the box main body and covers the opening to be openable and closable. The opening and closing mechanism includes: a right opening and closing mechanism that makes the lid body perform an opening and closing operation around a left rotating shaft that extends along a left peripheral edge of the opening of the box main body; and a left opening and closing mechanism that makes the lid body perform an opening and closing operation around a right rotating shaft that extends along the right peripheral edge of the opening of the box main body.

The right opening and closing mechanism and the left opening and closing mechanism respectively include: a front rod disposed at a front part of the lid body, a rear rod disposed at a rear part of the lid body, a front engagement hole provided at a front part of the box main body, and a rear engagement hole provided at a rear part of the box main body. The front rod and the rear rod can be respectively displaced in a front-rear direction to be engageable with the box main body. The front rod can be engaged with the front engagement hole. The rear rod can be engaged with the rear engagement hole.

In addition, each opening and closing mechanism includes: a biasing member that generates a biasing force for engaging the rod of the lid body with the engagement hole of the box main body; and an operation unit that displaces the rod in a releasing direction in which the engagement of the rod with the engagement hole of the box main body is released against the biasing force of the biasing member by an opening operation. For example, when the operation unit of the right opening and closing mechanism is opened, the front rod and the rear rod are engaged with the box main body in the left opening and closing mechanism, and the front rod and the rear rod in the right opening and closing mechanism are disengaged from the engagement holes of the box main body, so that the engagement with the engagement holes is released, and accordingly, the right side of the lid body is opened.

In addition, the opening and closing mechanism includes a malfunction prevention device that prevents displacement of the rod by the opening operation to the operation unit of the right opening and closing mechanism and displacement of the rod by the opening operation to the operation unit of the left opening and closing mechanism from being performed at the same time. The malfunction prevention device restricts the displacement of the rod on an open side of the lid body in an engaging direction with respect to the engagement hole when the lid body is in either the right open state or the left open state, and accordingly, the rod on a closed side of the lid body is restricted from being displaceable in the releasing direction in which the engagement with the engagement hole is released.

In the double opening storage device described in JP-A-2016-112979, the malfunction prevention device includes a right stopper mechanism that restricts the displacement of the rod on the right side in a direction to be engaged with the engagement hole when the lid body is in the right open state, and a left stopper mechanism that restricts the displacement of the rod on the left side in a direction to be engaged with the engagement hole when the lid body is in the left open state. When the right stopper mechanism and the left stopper mechanism are independent mechanisms, it becomes necessary to prepare dedicated components, respectively, and thus, the structure of the entire malfunction prevention device becomes enlarged.

SUMMARY

The invention has been made in view of the circumstances, and an object thereof is to provide a double opening storage device that can make a malfunction prevention device compact.

According to an aspect of the invention, there is provided a double opening storage device including: a box main body including an accommodation unit provided with an opening; a lid body that covers the opening to be openable and closable; and an opening and closing mechanism that makes the lid body perform an opening and closing operation around a rotating shaft selected from between a first rotating shaft and a second rotating shaft which respectively extend in a front-rear direction along a peripheral edge of the opening, wherein: the opening and closing mechanism includes: a first rod that is disposed in the lid body to correspond to the first rotating shaft and is displaced to be engageable with the box main body side; a second rod that is disposed in the lid body to correspond to the second rotating shaft and is displaced to be engageable with the box main body side; a first engagement hole that is provided on the box main body side to correspond to the first rod and is engageable with a tip end of the first rod; a second engagement hole that is provided on the box main body side to correspond to the second rod and is engageable with a tip end of the second rod; a first biasing member that generates a biasing force for engaging the first rod with the first engagement hole; a second biasing member that generates a biasing force for engaging the second rod with the second engagement hole; a first operation unit that displaces the first rod in a releasing direction in which the engagement with the first engagement hole is released against the biasing force of the first biasing member by an opening operation; a second operation unit that displaces the second rod in a releasing direction in which the engagement with the second engagement hole is released against the biasing force of the second biasing member by an opening operation; and a malfunction prevention device that prevents the displacement of the first rod due to the opening operation to the first operation unit and the displacement of the second rod due to the opening operation to the second operation unit from being performed at the same time; the malfunction prevention device includes: a base member that is attached to a center portion in a left-right direction of the lid body; a first stopper that is disposed on a left side with respect to the base member and is rotatable around a first shaft extending in a front-rear direction with respect to the base member; a second stopper that is disposed on a right side with respect to the base member and is rotatable around a second shaft extending in the front-rear direction with respect to the base member; and a spring member which includes one end fixed to the first stopper and the other end fixed to the second stopper, and which generates a biasing force for rotating the first stopper in a first rotating direction around the first shaft and for rotating the second stopper in a second rotating direction around the second shaft; the first stopper includes: a first rotation restricting unit that restricts rotation of the first stopper in the first rotating direction due to the biasing force of the spring member by abutting against the box main body when the lid body is not in a left open state; and a first displacement restricting unit that restricts displacement of the first rod in a direction to be engaged with the first engagement hole against the biasing force of the first biasing member by abutting against a tip end surface of the first rod in a state where the first stopper rotates in the first rotating direction due to the biasing force of the spring member when the lid body is in the left open state; and the second stopper includes: a second rotation restricting unit that restricts rotation of the second stopper in the second rotating direction against the biasing force of the spring member by abutting against the box main body when the lid body is not in a right open state; and a second displacement restricting unit that restricts displacement of the second rod in a direction to be engaged with the second engagement hole against the biasing force of the second biasing member by abutting against a tip end surface of the second rod in a state where the second stopper rotates in the second rotating direction due to the biasing force of the spring member when the lid body is in the right open state.

According to the configuration, it is possible to prevent the opening operation to the first operation unit and the opening operation to the second operation unit from being performed at the same time by using the base member, the first stopper, the second stopper, and the spring member, thereby preventing the lid body from being in the left open state and the right open state simultaneously. In addition, since the opening operation to the first operation unit and the opening operation to the second operation unit are prevented from being performed at the same time and the common base member and the spring member are used, it is possible to make the malfunction prevention device compact.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, a specific embodiment of a double opening storage device according to the invention will be described with reference to FIGS. 1 to 17.

Figure 1:
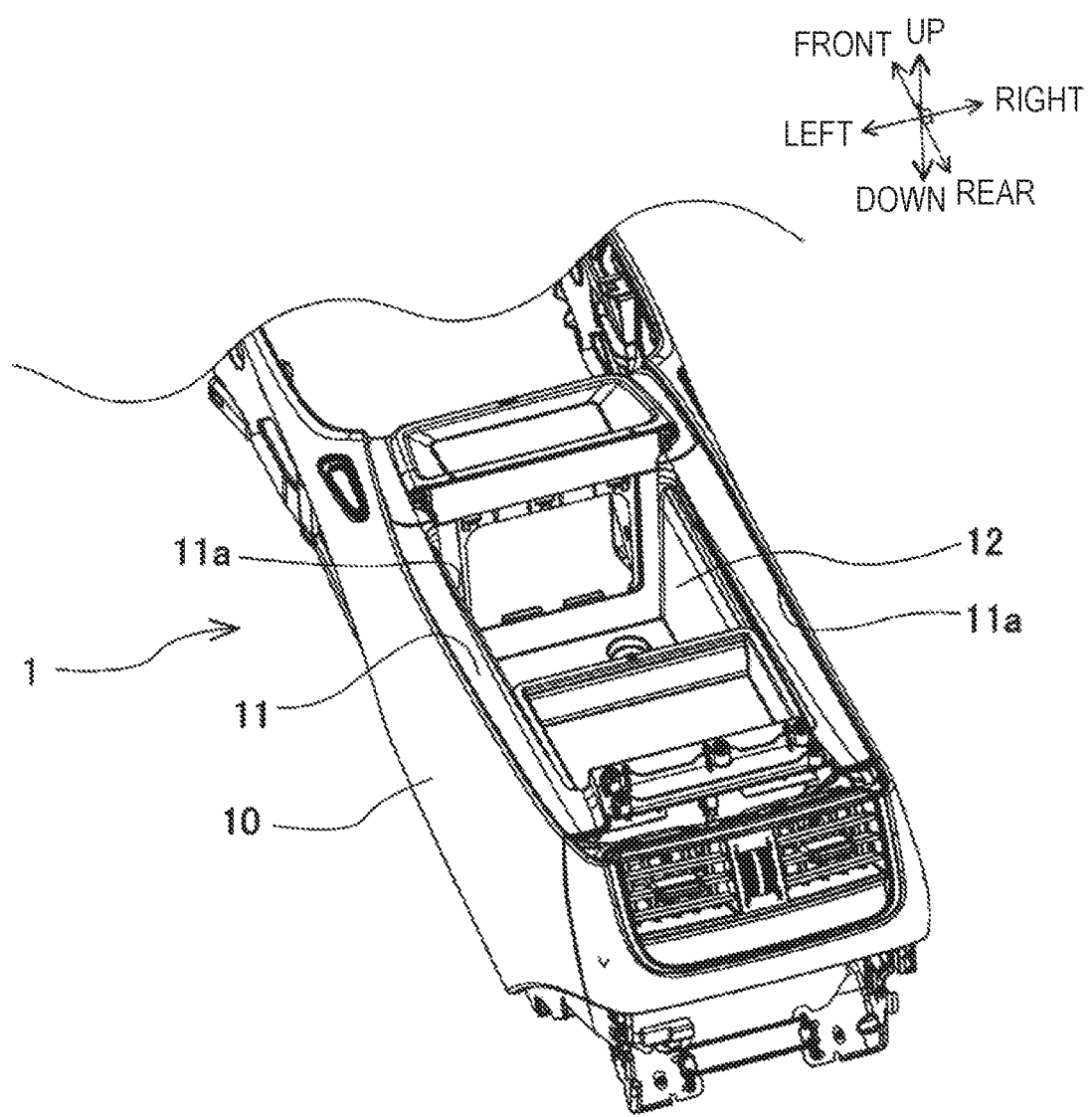
FIG. 1 is a perspective view illustrating a box main body included in a double opening storage device of an embodiment of the invention.
Figure 2:
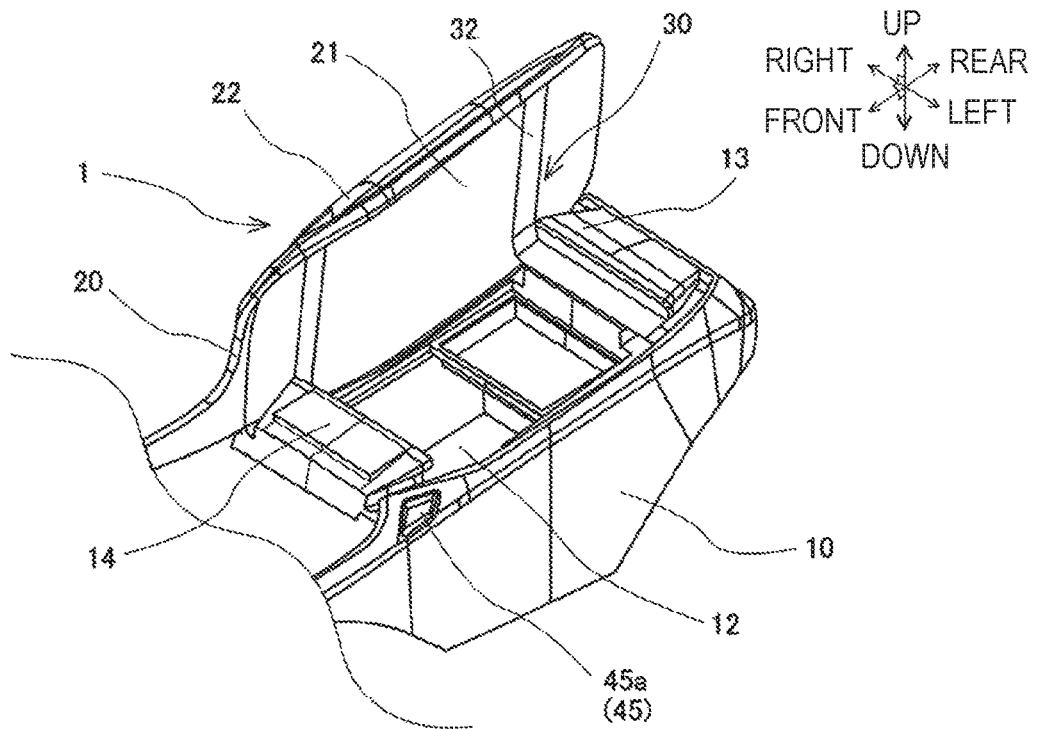
FIG. 2 is a perspective view illustrating a lid body included in the double opening storage device of the embodiment at a left open state.
Figure 3:
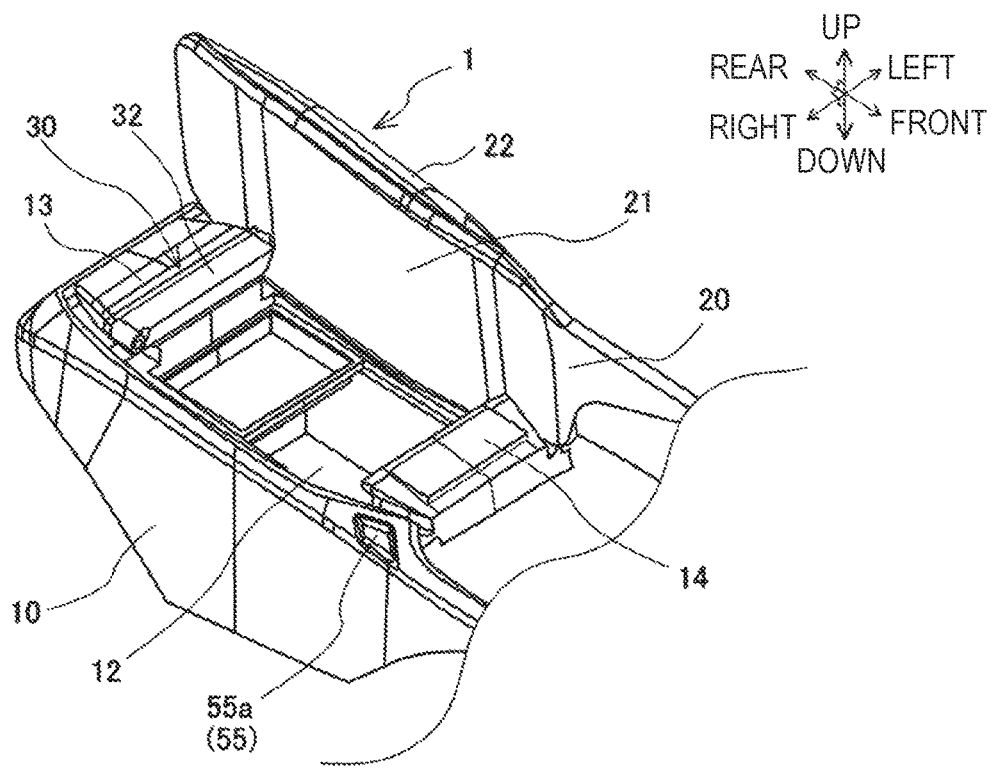
FIG. 3 is a perspective view illustrating the lid body included in the double opening storage device of the embodiment at a right open state.

A double opening storage device 1 is, for example, a console box installed in a center console disposed in a vehicle cabin of a vehicle. As illustrated in FIGS. 1 to 3, the double opening storage device 1 includes a box main body 10, a lid body 20, and an opening and closing mechanism 30. The double opening storage device 1 is configured such that the lid body 20 can perform an opening and closing operation with respect to the box main body 10 with the opening and closing mechanism 30. Furthermore, the double opening storage device 1 may be used as an armrest for placing an arm of an occupant when the lid body 20 is at a closed position. In the embodiment, the contents indicating the direction depend on the vehicle in which the double opening storage device 1 is installed unless there is special circumstance. For example, the "right side" indicates to a vehicle right side with respect to a vehicle traveling direction and the "left side" indicates to a vehicle left side with respect to the vehicle traveling direction.

The box main body 10 is formed in a substantially box-like shape. The box main body 10 is fixed to a vehicle body with bolt-fastening or the like. The box main body 10 includes a substantially rectangular parallelepiped accommodation unit 12 provided with an opening 11 on an upper surface. The box main body 10 may be formed with a side wall and a bottom wall surrounding the accommodation unit 12, and may include a frame or the like for housing a cup holder or the like. A peripheral edge of the opening 11 includes two sides 11a that respectively extend in a vehicle front-rear direction. The double opening storage device 1 is disposed such that the side 11a extends in the vehicle front-rear direction.

Figure 4:
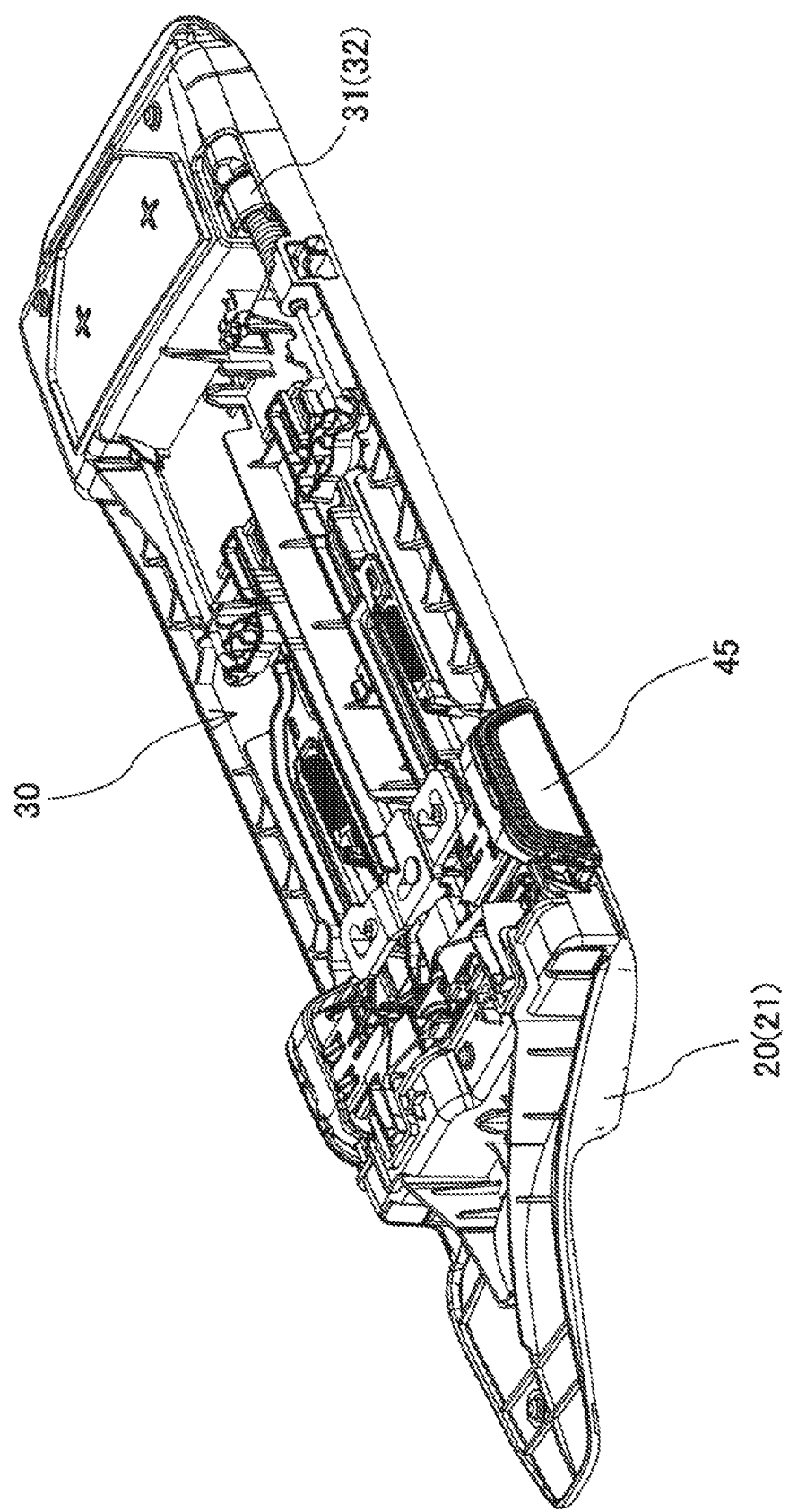
FIG. 4 is a perspective view illustrating an opening and closing mechanism included in the double opening storage device of the embodiment.

The lid body 20 is formed in a shape (for example, as illustrated in FIGS. 2 to 4, and the like, the lid body may also be a shape in which the armrest part on a driver's seat side extends forward) including a rectangular part that corresponds to the opening 11 of the box main body 10. The lid body 20 covers the opening 11 of the box main body 10 to be openable and closable. The lid body 20, from a closed position where the lid body covers the opening 11, can perform the opening and closing operation (that is, right opening and closing operation) around a rotating shaft (hereinafter, referred to as a left rotating shaft) that extends in the front-rear direction along the side 11a on the left side of the peripheral edge of the opening 11, and can perform the opening and closing operation (that is, left opening and closing operation) around a rotating shaft (hereinafter, referred to as a right rotating shaft) that extends in the front-rear direction along the side 11a on the right side of the peripheral edge of the opening 11. The lid body 20 can perform the opening operation on the both left and right sides with respect to the box main body 10 from the closed position to a completely open position at a predetermined angle (for example, 100°).

The lid body 20 includes a bottom lid member 21 and a top lid member 22. The bottom lid member 21 includes a flat surface portion formed in a rectangular plate shape and a side wall portion that surrounds the peripheral edge of the flat surface portion. The top lid member 22 is formed in a rectangular shape that corresponds to the bottom lid member 21, and is formed in a rounded shape in appearance. The top lid member 22 covers the upper surface of the bottom lid member 21. The bottom lid member 21 and the top lid member 22 integrally form the lid body 20 by concavo-convex fitting or the like.

Figure 5:
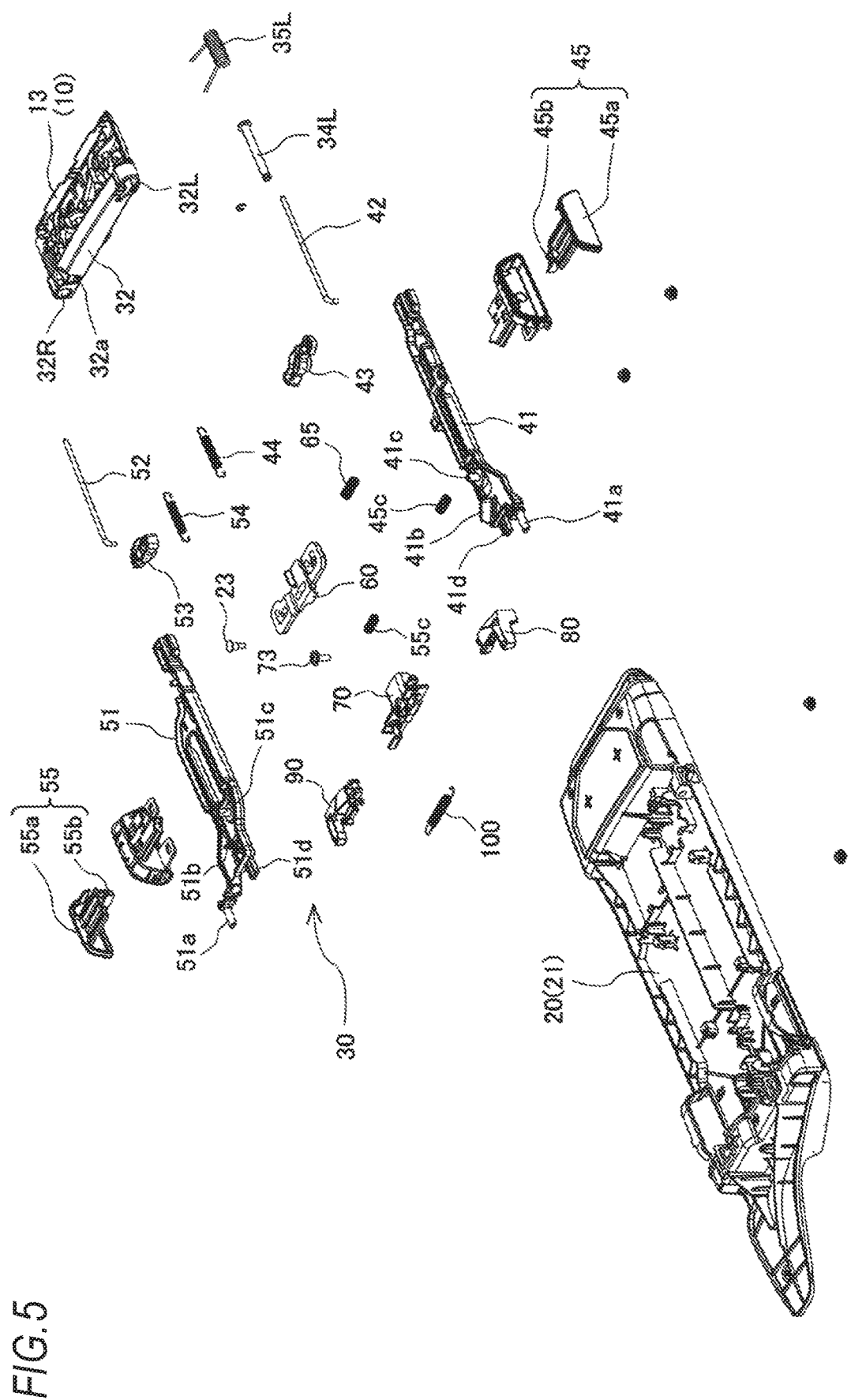
FIG. 5 is an exploded perspective view illustrating the opening and closing mechanism included in the double opening storage device of the embodiment.

The opening and closing mechanism 30 includes an arm unit 31 as illustrated in FIGS. 4 and 5. The arm unit 31 is a unit for making the lid body 20 perform the opening and closing operation around the rotating shaft after selecting any one of the left rotating shaft along the side 11a on the left and the right rotating shaft along the side 11a on the right.

Figure 6:
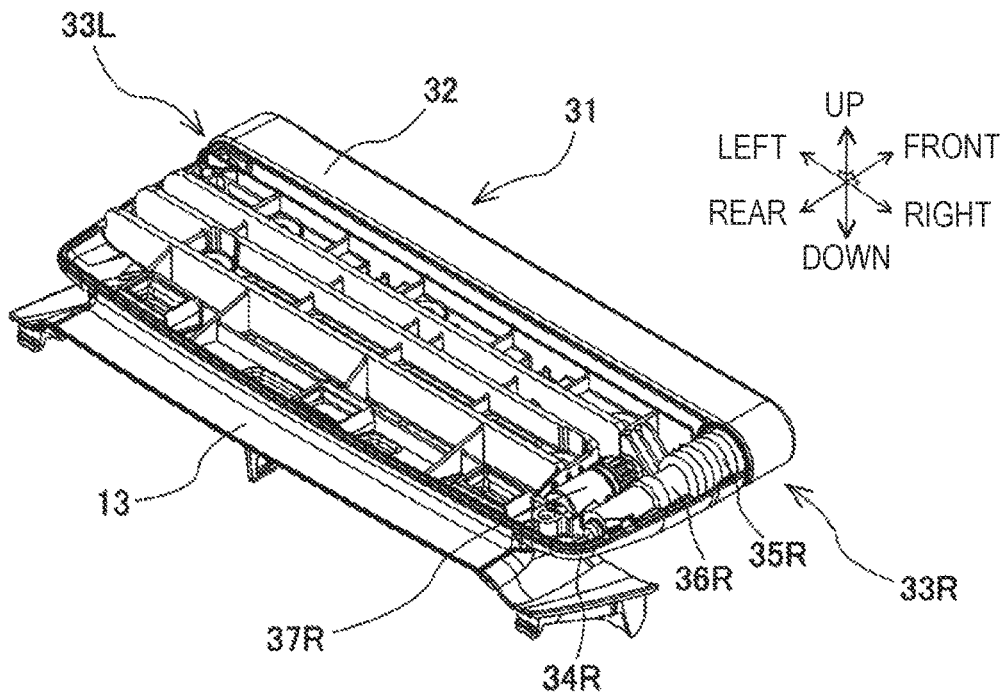
FIG. 6 is a perspective view illustrating an arm unit in the opening and closing mechanism included in the double opening storage device of the embodiment.
Figure 7:
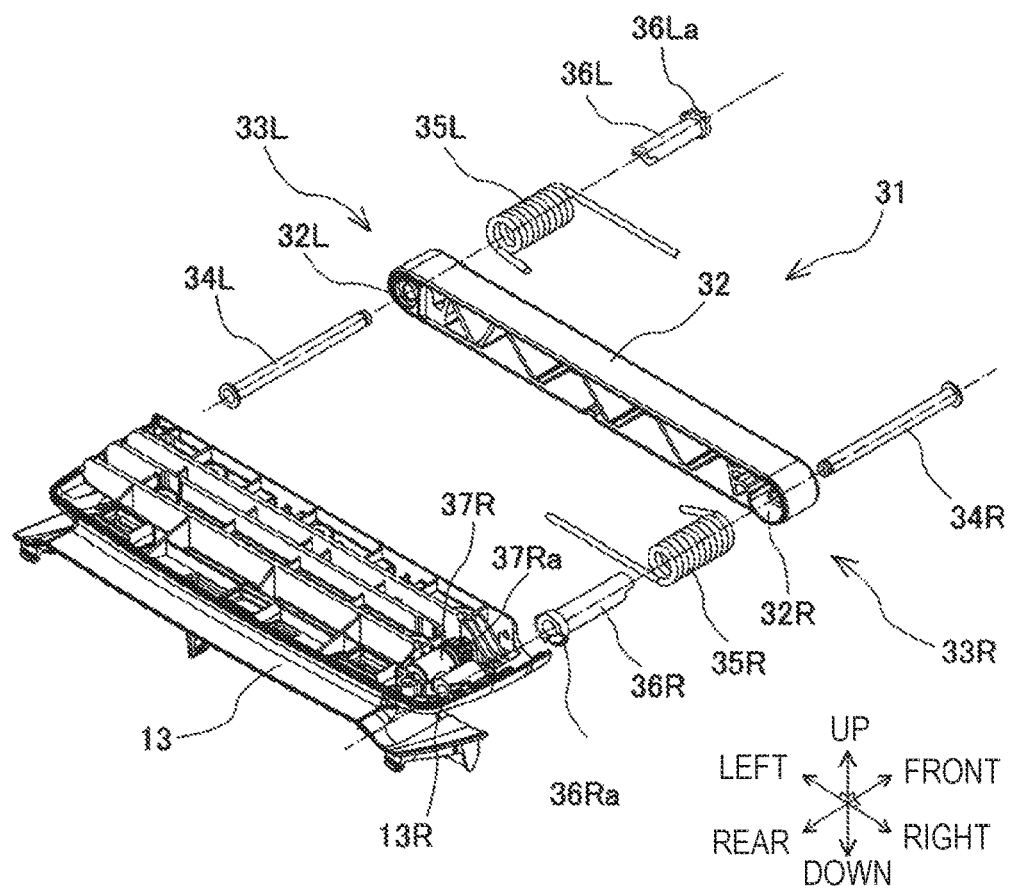
FIG. 7 is an exploded perspective view illustrating the arm unit in the opening and closing mechanism included in the double opening storage device of the embodiment.
Figure 8:
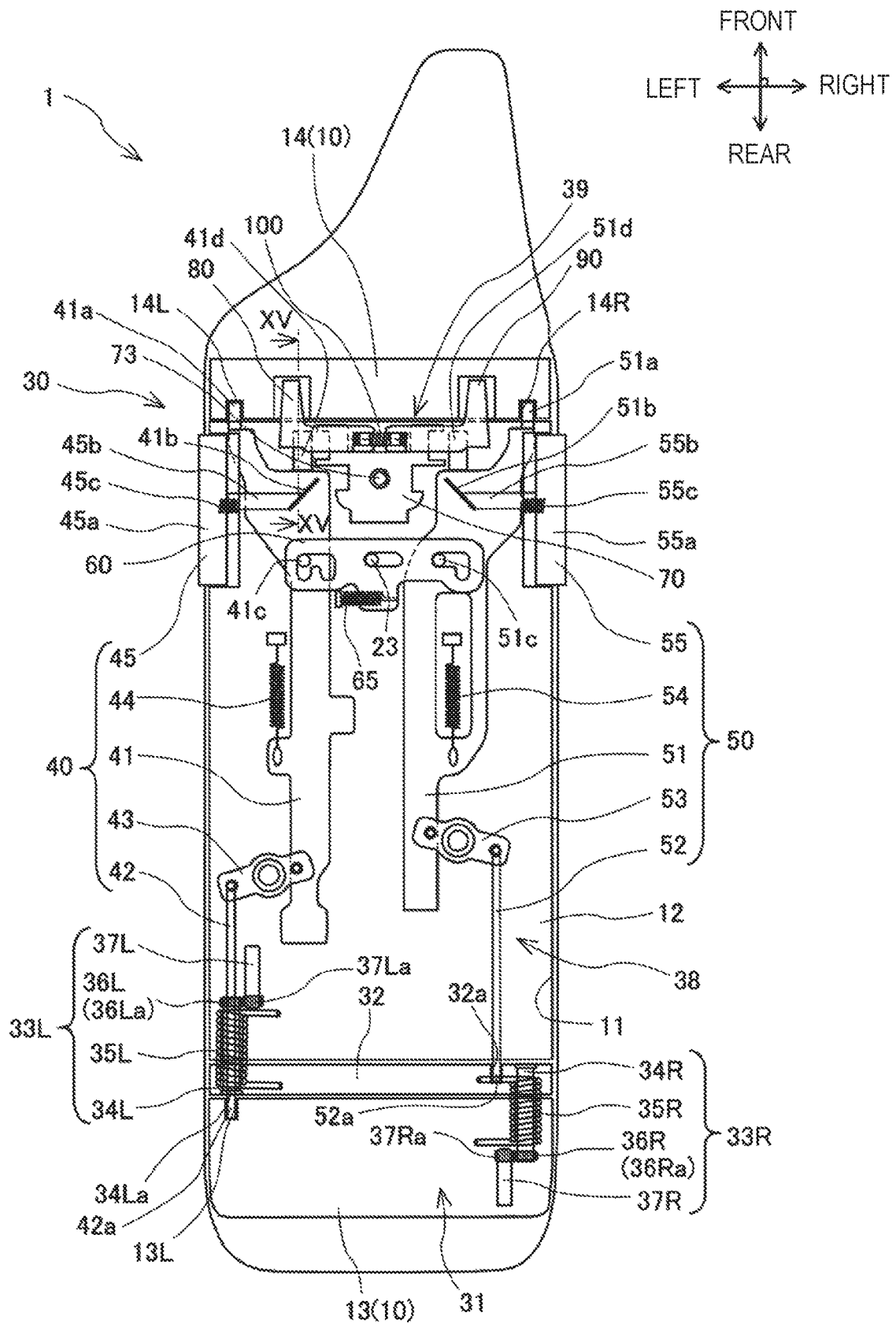
FIG. 8 is a configuration view illustrating the opening and closing mechanism included in the double opening storage device of the embodiment at a left closed state and a right closed state of the lid body.

As illustrated in FIGS. 6, to 8, the arm unit 31 includes an arm member 32, a left pivot support portion 33L, and a right pivot support portion 33R. The arm member 32 is an arm-shaped plate member formed in an elongated shape. The arm member 32 is disposed such that the longitudinal direction thereof extends in a vehicle left-right direction at the closed position of the lid body 20. The arm member 32 is disposed between a rear base portion 13 of the box main body 10 and the lid body 20, and then is interposed between the rear base portion 13 and the lid body 20. The arm member 32 is disposed such that a front surface is along the side wall formed on the rear side of the lid body 20 and a rear surface is along the side wall formed on the rear side of the accommodation unit 12 of the box main body 10, at the closed position of the lid body 20. The arm member 32 has substantially the same length as the width in the left-right direction of the lid body 20 in the longitudinal direction.

The arm member 32 is configured to be swingably supported by the lid body 20 at a left end portion and to be swingably supported by the rear base portion 13 of the box main body 10 at a right end portion. The arm member 32 is capable of swinging with respect to the lid body 20 around the left rotating shaft and is capable of swinging with respect to the rear base portion 13 of the box main body 10 around the right rotating shaft. The arm member 32 is provided with two through-holes 32L and 32R. The through-hole 32L is provided on the left end side of the arm member 32 and penetrates therethrough in the front-rear direction. The through-hole 32R is provided on the right end side of the arm member 32 and penetrates therethrough in the front-rear direction.

The left pivot support portion 33L is disposed on the left end side of the arm member 32. The left pivot support portion 33L is a part for configuring the above-described left rotating shaft, and makes the lid body 20 perform the opening and closing operation (that is, right opening and closing operation) around the left rotating shaft. The left pivot support portion 33L includes a shaft body 34L, an arm spring 35L, a tubular body 36L, and a damper 37L.

The shaft body 34L is a collar formed in a cylindrical shape. The shaft body 34L is inserted into the left through-hole 32L forward from the left rear side of the arm member 32. The rear end side of the shaft body 34L is fixed to the arm member 32. The front end side of the shaft body 34L protrudes forward from an opening on the front side of the through-hole 32L. A support hole (not illustrated) is provided in the bottom lid member 21 of the lid body 20. The front end side of the shaft body 34L is inserted into the support hole of the lid body 20 and is rotatably supported with respect to the lid body 20. The shaft body 34L extends in the front-rear direction along the side 11a on the left side of the peripheral edge of the opening 11. The shaft body 34L configures the above-described left rotating shaft. The arm member 32 is capable of swinging with respect to the lid body 20 by the shaft body 34L.

The arm spring 35L is wound around the shaft body 34L. The arm spring 35L is a torsion spring that generates a biasing force for swinging the arm member 32 with respect to the lid body 20. The biasing force of the arm spring 35L becomes the maximum value at the closed position of the lid body 20. One end of the arm spring 35L is fixed to the arm member 32. The other end of the arm spring 35L is fixed to the bottom lid member 21 of the lid body 20.

The tubular body 36L is externally inserted into the shaft body 34L. The tubular body 36L is formed in a hollow cylindrical shape and provided coaxially with the shaft body 34L. The tubular body 36L integrally rotates with the lid body 20 as the shaft body 34L rotates. An external tooth 36La is formed in the tubular body 36L. A plurality of external teeth 36La are arranged along an outer circumference of the tubular body 36L.

The damper 37L is an attenuation device that decelerates a swinging speed when the arm member 32 swings with respect to the lid body 20 (specifically, when the lid body 20 is opened on the right side). The damper 37L is formed in a cylindrical shape. The damper 37L is attached and fixed to the bottom lid member 21 of the lid body 20. An external tooth 37La is formed in the damper 37L. A plurality of external teeth 37La are arranged along the outer circumference of the damper 37L. The external teeth 37La of the damper 37L and the external teeth 36La of the tubular body 36L mesh with each other. The damper 37L applies an attenuating force for decelerating the swinging speed to the shaft body 34L through the tubular body 36L.

The right pivot support portion 33R is disposed on the right side of the arm member 32. The right pivot support portion 33R is a part for configuring the above-described right rotating shaft, and makes the lid body 20 perform the opening and closing operation (that is, left opening and closing operation) around the right rotating shaft. The right pivot support portion 33R includes a shaft body 34R, an arm spring 35R, a tubular body 36R, and a damper 37R.

The shaft body 34R is formed in a columnar shape. The shaft body 34R is inserted into the right through-hole 32R rearward from the right front side of the arm member 32. The front end side of the shaft body 34R is fixed to the arm member 32. The rear end side of the shaft body 34R protrudes rearward from an opening on the rear side of the through-hole 32R. A support hole 13R is provided in the right end portion of the rear base portion 13 of the box main body 10. The rear end side of the shaft body 34R is inserted into the support hole 13R of the rear base portion 13 and is rotatably supported with respect to the rear base portion 13 of the box main body 10. The shaft body 34R extends in the front-rear direction along the side 11a on the right side of the peripheral edge of the opening 11. The shaft body 34R configures the above-described right rotating shaft. The arm member 32 is swingable with respect to the rear base portion 13 of the box main body 10 by the shaft body 34R.

The arm spring 35R is wound around the shaft body 34R. The arm spring 35R is a torsion spring that generates the biasing force for swinging the arm member 32 with respect to the rear base portion 13 of the box main body 10. The biasing force of the arm spring 35L is maximum at the closed position of the lid body 20. One end of the arm spring 35R is fixed to the arm member 32. The other end of the arm spring 35R is fixed to the rear base portion 13 of the box main body 10.

The tubular body 36R is externally inserted into the shaft body 34R. The tubular body 36R is formed in a hollow cylindrical shape and provided coaxially with the shaft body 34R. The tubular body 36R integrally rotates as the shaft body 34R rotates with respect to the rear base portion 13 of the box main body 10. An external tooth 36Ra is formed in the tubular body 36R. A plurality of external teeth 36Ra are arranged along an outer circumference of the tubular body 36R.

The damper 37R is an attenuation device that decelerates the swinging speed when the arm member 32 swings with respect to the rear base portion 13 of the box main body 10 (specifically, when the lid body 20 is opened on the left side). The damper 37R is formed in a cylindrical shape. The damper 37R is attached and fixed to the rear base portion 13 of the box main body 10. An external tooth 37Ra is formed in the tamper 37R A plurality of external teeth 37Ra are arranged along the outer circumference of the damper 37R.

The external teeth 37Ra of the damper 37R and the external teeth 36Ra of the tubular body 36R mesh with each other. The damper 37R applies the attenuating force for decelerating the swinging speed to the shaft body 34R through the tubular body 36R.

The opening and closing mechanism 30 is a device that holds at least one of the left side and the right side of the lid body 20 at the closed position with respect to the box main body 10, and releases the holding of the closed position on the other side in a state where one side is held at the closed position with respect to the box main body 10. As illustrated in FIG. 8, the opening and closing mechanism 30 includes a left locking device 40 and a right locking device 50. The left locking device 40 is disposed on the left side of the lid body 20. The left locking device 40 is a device that holds the left side of the lid body 20 at the closed position and releases the holding of the left side at the closed position. Further, the right locking device 50 is disposed on the right side of the lid body 20. The right locking device 50 is a device that holds the right side of the lid body 20 at the closed position and releases the holding of the right side at the closed position.

The left locking device 40 includes a left first rod 41, a left second rod 42, a left synchronizing device 43, a left rod biasing member 44, and a left operation unit 45. The left first rod 41 is a rod member that is arranged on the front part side of the lid body 20 and extends in the front-rear direction. The left first rod 41 is formed in a plate shape. The left second rod 42 is a rod member that is arranged on the rear part side of the lid body 20 and extends substantially in the front-rear direction. The left second rod 42 is formed in a rod shape. The left first rod 41 and the left second rod 42 are supported so as to be displaceable in the front-rear direction with respect to the lid body 20.

The left first rod 41 can be displaced in the front-rear direction between a state where a front end portion 41a protrudes forward from the front end of the main body of the lid body 20 and a state where the front end portion 41a enters the main body of the lid body 20. An engagement hole 14L into which the front end portion 41a of the left first rod 41 is inserted and engaged is provided in the left end portion of the rear surface of a front base portion 14 of the box main body 10. The front end portion 41a of the left first rod 41 is engaged with the engagement hole 14L of the front base portion 14 of the box main body 10 when the front end portion 41a protrudes forward from the front end of the main body of the lid body 20. The left first rod 41 configures the above-described left rotating shaft in a state where the front end portion 41a is engaged with the engagement hole 14L of the front base portion 14.

A rear end portion 42a of the left second rod 42 is inserted into a through-hole 34La that is formed around the shaft body 34L of the left pivot support portion 33L. The left second rod 42 can be displaced in the front-rear direction between a state where the rear end portion 42a protrudes rearward from the rear end of the arm member 32 and a state where the rear end portion 42a enters the arm member 32 further at the rear end of the main body of the lid body 20. An engagement hole 13L into which the rear end portion 42a of the left second rod 42 is inserted and engaged is provided in the left end portion of the front surface of the rear base portion 13 of the box main body 10. The rear end portion 42a of the left second rod 42 is engaged with the engagement hole 13L of the rear base portion 13 of the box main body 10 when the rear end portion 42a protrudes rearward from the rear end of the arm member 32.

The left synchronizing device 43 is disposed between the left first rod 41 and the left second rod 42. The left synchronizing device 43 is a device that displaces the left first rod 41 and the left second rod 42 in synchronization with each other in a direction to be approach each other or in a direction to be away from each other. The left synchronizing device 43 is a disk-shaped rotating body rotatably supported by the bottom lid member 21 of the lid body 20. On the right side of the left synchronizing device 43, the rear part of the left first rod 41 is rotatably supported. On the left side of the left synchronizing device 43, the front part of the left second rod 42 is rotatably supported. A supporting point of the left first rod 41 and a supporting point of the left second rod 42 in the left synchronizing device 43 are separated from each other by approximately 180° in the circumferential direction and are positioned substantially symmetrically across the rotation center of the left synchronizing device 43.

The left rod biasing member 44 is a helical spring that generates a biasing force for biasing the left first rod 41 forward with respect to the lid body 20. One end of the left rod biasing member 44 is fixed to the left first rod 41. The other end of the left rod biasing member 44 is fixed to the bottom lid member 21 of the lid body 20. The biasing force of the left rod biasing member 44 rotates the left synchronizing device 43 counterclockwise (leftwards) when viewed from above through the left first rod 41, and accordingly, the biasing force becomes a force for biasing the left second rod 42 rearward with respect to the lid body 20.

The left operation unit 45 is disposed on the left side of the lid body 20. The left operation unit 45 includes a button portion 45a and a mechanism portion 45b. The button portion 45a is provided on a left wall side of the lid body 20. The button portion 45a is biased leftward with respect to the lid body 20 by a spring 45c, and is held to be flush along the left wall of the lid body 20 in a state where the operator is not pushing the button portion 45a rightwards. The button portion 45a can move relatively rightward with respect to the lid body 20 against the biasing force of the spring 45c by a rightward pressing operation of the operator.

The mechanism portion 45b is a mechanism for engaging the button portion 45a and the left first rod 41 with each other. The mechanism portion 45b includes a rod portion that extends rightward from the button portion 45a. A right tip end of the rod portion includes a pressing inclined surface in which the rear side is obliquely cut out. The pressing inclined surface of the mechanism portion 45b does not abut against an engaging unit 41b of which a surface is oriented diagonally to the left front provided in the left first rod 41 in a state where the button portion 45a is not pressed rightwards, that is, in a state where the button portion 45a is flush along the left wall of the front base portion 14. In the state, the biasing force for displacing the left first rod 41 rearward with respect to the lid body 20 is not applied.

Meanwhile, when the button portion 45a is pressed rightwards, the pressing inclined surface of the mechanism portion 45b abuts against the engaging unit 41b of the left first rod 41. When the rightward pressing of the mechanical portion 45b continues, as the abutting between the mechanical portion 45b and the engaging unit 41b progresses, the biasing force for displacing the left first rod 41 rearwards is applied such that the left first rod 41 enters the lid body 20 against the biasing force of the left rod biasing member 44, and thus, the left first rod 41 is displaced rearward with respect to the mechanism portion 45b. In this case, when the left first rod 41 is displaced rearwards, as the left synchronizing device 43 rotates rightwards, the left second rod 42 is displaced forward.

When the lid body 20 is in a closed state (that is, left closed state and right closed state) and the button portion 45a of the left operation unit 45 is not pressed rightwards, and when the lid body 20 is in the right open state, the front end portion 41a of the left first rod 41 protrudes forward from the front end of the main body of the lid body 20 and is engaged with the engagement hole 14L of the front base portion 14 of the box main body 10. In addition, at the same time, the rear end portion 42a of the left second rod 42 protrudes rearward from the rear end of the arm member 32, and is engaged with the engagement hole 13L of the rear base portion 13 of the box main body 10 via the arm member 32. Hereinafter, the state is referred to as a left locked state.

When the button portion 45a of the left operation unit 45 is pressed rightwards in the left locked state and when the lid body 20 is in the left open state, the front end portion 41a of the left first rod 41 is positioned behind the front end of the main body of the lid body 20, and enters the lid body 20, and accordingly, the engagement between the left first rod 41 and the front base portion 14 is released. In addition, at this time, since the left synchronizing device 43 rotates rightwards, the rear end portion 42a of the left second rod 42 is positioned in front of the rear end of the arm member 32 and enters the arm member 32, the engagement between the left second rod 42 and the rear base portion 13 is released. Hereinafter, the state is referred to as a left lock released state.

The right locking device 50 includes a right first rod 51, a right second rod 52, a right synchronizing device 53, a right rod biasing member 54, and a right operation unit 55. The right first rod 51 is a rod member that is arranged on the front part side of the lid body 20 and extends in the front-rear direction. The right first rod 51 is formed in a plate shape. The right second rod 52 is a rod member that is arranged on the rear part side of the lid body 20 and extends substantially in the front-rear direction. The right second rod 52 is formed in a rod shape. The right first rod 51 and the right second rod 52 are respectively supported so as to be displaceable in the front-rear direction with respect to the lid body 20.

The right first rod 51 can be displaced in the front-rear direction between a state where a front end portion 51a protrudes forward from the front end of the main body of the lid body 20 and a state where the front end portion 51a enters the main body of the lid body 20. An engagement hole 14R into which the front end portion 51a of the right first rod 51 is inserted and engaged is provided in the right end portion of the rear surface of the front base portion 14 of the box main body 10. The front end portion 51a of the right first rod 51 is engaged with the engagement hole 14R of the front base portion 14 of the box main body 10 when the front end portion 51a protrudes forward from the front end of the main body of the lid body 20. The right first rod 51 configures the above-described right rotating shaft in a state where the front end portion 51a is engaged with the engagement hole 14R of the front base portion 14.

The right second rod 52 can be displaced in the front-rear direction between a state where a rear end portion 52a protrudes rearward from the rear end of the main body of the lid body 20 and a state where the rear end portion 52a enters the main body of the lid body 20. An engagement hole 32a into which the rear end portion 52a of the right second rod 52 is inserted and engaged is provided on the right side of the front surface of the arm member 32. The rear end portion 52a of the right second rod 52 is engaged with the engagement hole 32a of the arm member 32 when the rear end portion 52a protrudes rearward from the rear end of the main body of the lid body 20.

The right synchronizing device 53 is disposed between the right first rod 51 and the right second rod 52. The right synchronizing device 53 is a device that displaces the right first rod 51 and the right second rod 52 in synchronization with each other in a direction to be approach each other or in a direction to be away from each other. The right synchronizing device 53 is a disk-shaped rotating body rotatably supported by the bottom lid member 21 of the lid body 20. On the left side of the right synchronizing device 53, the rear part of the right first rod 51 is rotatably supported. On the right side of the right synchronizing device 53, the front part of the right second rod 52 is rotatably supported. A supporting point of the right first rod 51 and a supporting point of the right second rod 52 in the right synchronizing device 53 are separated from each other by approximately 180° in the circumferential direction and are positioned substantially symmetrically across the rotation center of the right synchronizing device 53.

The right rod biasing member 54 is a helical spring that generates the biasing force for biasing the right first rod 51 forward with respect to the lid body 20. One end of the right rod biasing member 54 is fixed to the right first rod 51. The other end of the right rod biasing member 54 is fixed to the bottom lid member 21 of the lid body 20. The biasing force of the right rod biasing member 54 rotates the right synchronizing device 53 counterclockwise (rightwards) when viewed from above through the right first rod 51, and accordingly, the biasing force becomes a force for biasing the right second rod 52 rearward with respect to the lid body 20.

The right operation unit 55 is disposed on the right side of the lid body 20. The right operation unit 55 includes a button portion 55a and a mechanism portion 55b. The button portion 55a is provided on the right wall side of the lid body 20. The button portion 55a is biased rightward with respect to the lid body 20 by a spring 55c, and is held to be flush along the right wall of the lid body 20 in a state where the operator is not pushing the button portion 55a leftwards. The button portion 55a can move relatively leftward with respect to the lid body 20 against the biasing force of the spring 55c by a leftward pressing operation of the operator.

The mechanism portion 55b is a mechanism for engaging the button portion 55a and the right first rod 51 with each other. The mechanism portion 55b includes a rod portion that extends leftward from the button portion 55a. A left tip end of the rod portion includes a pressing inclined surface in which the rear side is obliquely cut out. The pressing inclined surface of the mechanism portion 55b does not abut against an engaging unit 51b of which a surface is oriented diagonally to the left front provided in the right first rod 51 in a state where the button portion 55a is not pressed leftwards, that is, in a state where the button portion 55a is flush along the right wall of the front base portion 14. In the state, the biasing force for displacing the right first rod 51 rearward with respect to the lid body 20 is not applied.

Meanwhile, when the button portion 55a is pressed leftwards, the pressing inclined surface of the mechanism portion 55b abuts against the engaging unit 51b of the right first rod 51. When the leftward pressing of the mechanical portion 55b continues, as the abutting between the mechanical portion 55b and the engaging unit 51b progresses, the biasing force for displacing the right first rod 51 rearwards is applied such that the right first rod 51 enters the lid body 20 against the biasing force of the right rod biasing member 54, and thus, the right first rod 51 is displaced rearward with respect to the mechanism portion 55b. In this case, when the right first rod 51 is displaced rearwards, as the right synchronizing device 53 rotates leftwards, the right second rod 52 is displaced forward.

When the lid body 20 is in a closed state (that is, left closed state and right closed state) and the button portion 55a of the right operation unit 55 is not pressed leftwards, and when the lid body 20 is in the left open state, the front end portion 51a of the right first rod 51 protrudes forward from the front end of the main body of the lid body 20 and is engaged with the engagement hole 14R of the front base portion 14 of the box main body 10. In addition, at this time, the rear end portion 52a of the right second rod 52 protrudes rearward from the rear end of the main body of the lid body 20, and is engaged with the engagement hole 32a of the arm member 32. Hereinafter, the state is referred to as a right locked state.

When the button portion 55a of the right operation unit 55 is pressed leftwards in the right locked state and when the lid body 20 is in the right open state, the front end portion 51a of the right first rod 51 is positioned behind the front end of the main body of the lid body 20, and enters the lid body 20, and accordingly, the engagement between the right first rod 51 and the front base portion 14 is released. In addition, at this time, as the rear end portion 52a of the right second rod 52 is positioned in front of the rear end of the main body of the lid body 20 by the leftward rotation of the right synchronizing device 53, and enters the lid body 20, the engagement between the right second rod 52 and the arm member 32 is released. Hereinafter, the state is referred to as a right lock released state.

The opening and closing mechanism 30 also includes a malfunction prevention device 39. The malfunction prevention device 39 is a device that performs the opening operation to the left operation unit 45 and the opening operation to the right operation unit 55 at the same time, that is, a device that prevents the displacement of the left first and second rods 41 and 42 in the front-rear direction and the displacement of the right first and second rods 51 and 52 in the front-rear direction from being performed at the same time. According to the malfunction prevention device 39, in a case where any one of the left locking device 40 and the right locking device 50 is in the lock released state, the other one is prevented from changing the state from the locked state to the lock released state.

The malfunction prevention device 39 includes a retainer 60, a base member 70, a left stopper 80, a right stopper 90, and a spring member 100. The base member 70, the left stopper 80, the right stopper 90, and the spring member 100 are integrally assembled and unitized.

Figure 9:
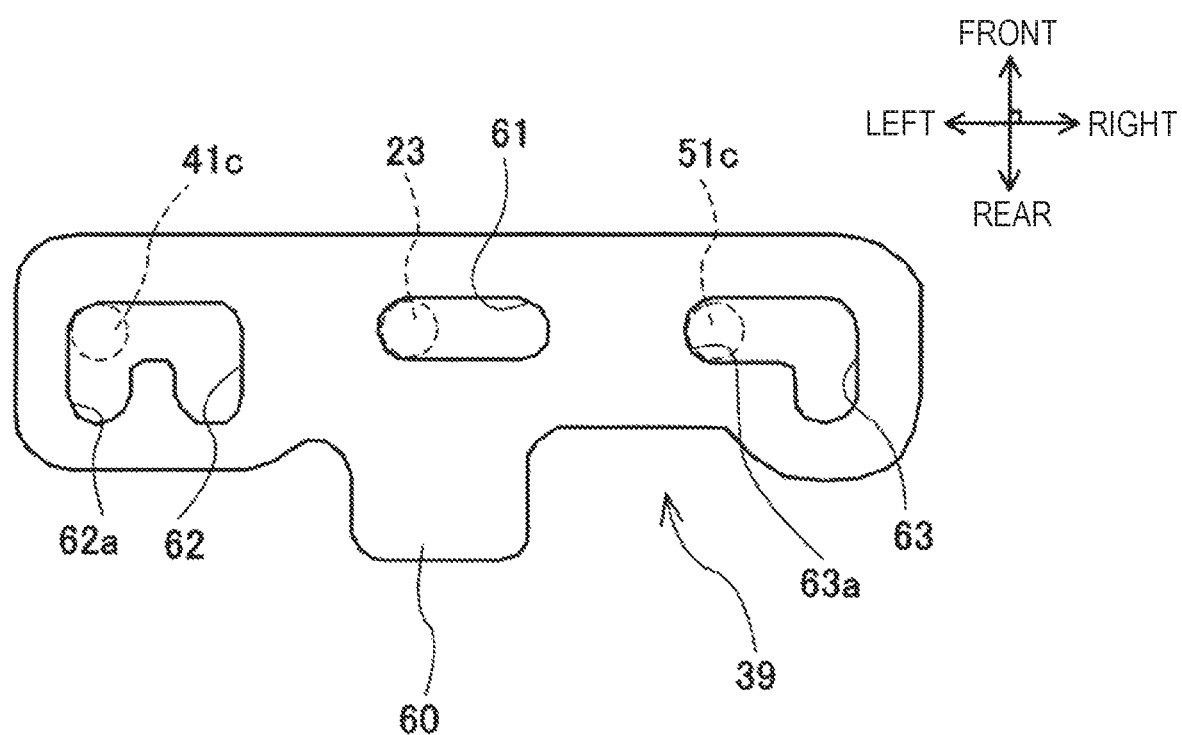
FIG. 9 is a top view illustrating a retainer in the opening and closing mechanism included in the double opening storage device of the embodiment.

As illustrated in FIG. 9, the retainer 60 is a member formed in a plate shape. The retainer 60 is rotatably supported around the support shaft 23 with respect to the bottom lid member 21 of the lid body 20. The support shaft 23 extends in an up-down direction and is screwed to the bottom lid member 21. The retainer 60 includes a support hole 61 into which the support shaft 23 is inserted. The support hole 61 is provided in the center portion in the left-right direction of the retainer 60. The retainer 60 is a member which restricts the displacement in the front-rear direction of the right first and second rods 51 and 52 by the pressing operation (opening operation) to the right operation unit 55 and maintains the right locking device 50 in the left open state of the lid body 20 where the left locking device 40 is in the left lock released state, and restricts the displacement in the front-rear direction of the left first and second rods 41 and 42 by the pressing operation (opening operation) to the left operation unit 45 and maintains the left locking device 40 in the left locked state in the right open state of the lid body 20 where the right locking device 50 is in the right lock released state.

The retainer 60 is provided with two pin insertion holes 62 and 63 that respectively penetrate therethrough in the up-down direction. The pin insertion hole 62 is disposed on the left side with respect to the support hole 61. The pin insertion hole 63 is disposed on the right side with respect to the support hole 61. Hereinafter, the pin insertion hole 62 is referred to as a left side pin insertion hole 62, and the pin insertion hole 63 is referred to as a right pin insertion hole 63, respectively.

The left pin insertion hole 62 and the right pin insertion hole 63 are formed to restrict the opening operation to the right operation unit 55 or the displacement of the right first and second rods 51 and 52 in the releasing direction in which the engagement with the box main body 10 or the arm member 32 is released in a case where an engagement pin 41c on the left side which will be described later is positioned in the rear end portion of the left pin insertion hole 62 as the left first and second rods 41 and 42 are displaced in the releasing direction in which the engagement with the box main body 10 is released by the opening operation to the left operation unit 45, and to restrict the opening operation to the left operation unit 45 or the displacement of the left first and second rods 41 and 42 in the releasing direction in which the engagement with the box main body 10 is further released in a case where the engagement pin 41c on the left side is positioned in the rear end portion of the left pin insertion hole 62 by the rotation of the entire retainer 60 around the support shaft 23 as the right first and second rods 51 and 52 are displaced in the releasing direction in which the engagement with the box main body 10 or the arm member 32 is released by the opening operation to the right operation unit 55.

The engagement pin 41c provided in the left first rod 41 is inserted into the left pin insertion hole 62. The engagement pin 41c is a columnar pin that extends upward from the upper surface of the left first rod 41. The left pin insertion hole 62 is formed in an elongated hole shape such that the relative displacement of the inserted engagement pin 41c in the front-rear direction is allowed. The left pin insertion hole 62 includes a long hole portion 62a. The long hole portion 62a extends in the front-rear direction such that the engagement pin 41c can be relatively displaced in the front-rear direction by the displacement when releasing the left locked state of the left first rod 41. Furthermore, the long hole portion 62a may extend in the circumferential direction around the support shaft 23 by which the retainer 60 is supported. The rear end portion of the long hole portion 62a may have a hole width in the left-right direction as large as an outer diameter of the engagement pin 41c, or may have a hole width in the left-right direction that largely exceeds the outer diameter of the engagement pin 41c. In addition, the left pin insertion hole 62 may include a hole portion which is necessary for assembling the retainer 60 to the lid body 20 and is connected to the long hole portion 62a.

Figure 10:
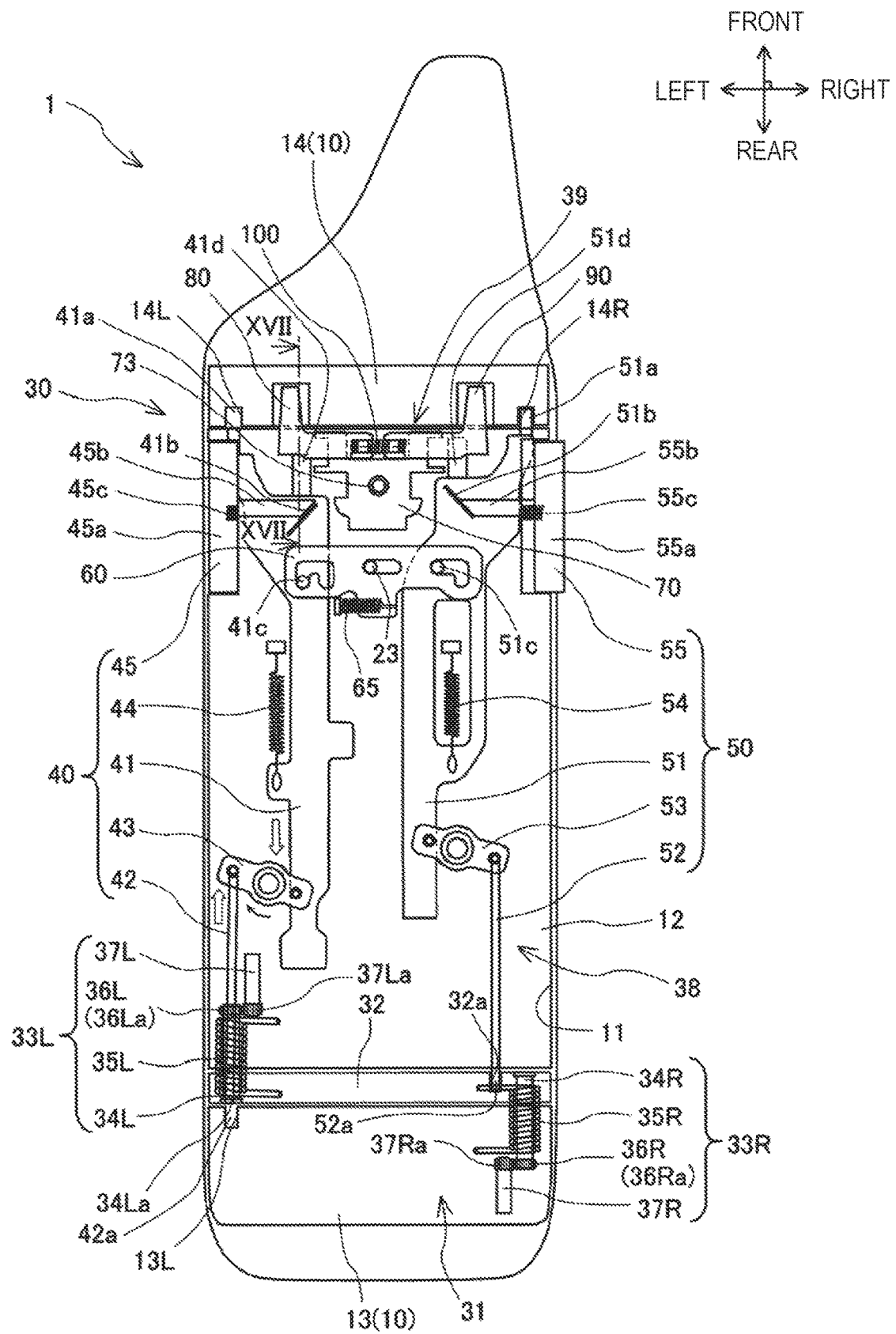
FIG. 10 is a configuration view illustrating the opening and closing mechanism included in the double opening storage device of the embodiment at the left open state of the lid body.

As illustrated in FIG. 8, the engagement pin 41c is positioned in the front end portion of the long hole portion 62a of the left pin insertion hole 62 in the left locked state (that is, including any of the closed state and the right open state of the lid body 20). In addition, as illustrated in FIG. 10, the engagement pin 41c is positioned in the rear end portion of the long hole portion 62a of the left pin insertion hole 62 when the left first rod 41 is displaced rearwards and the left locking device 40 is in the left lock released state (that is, the left open state of the lid body 20). The left first rod 41 can be relatively displaced in the front-rear direction with respect to the retainer 60 in the left locked state and in the left lock released state.

The engagement pin 51c provided in the right first rod 51 is inserted into the right pin insertion hole 63. The engagement pin 51c is a columnar pin that extends upward from the upper surface of the right first rod 51. The right pin insertion hole 63 is formed such that the relative rotation of the engagement pin 51c around the own shaft and the relative rotation of the retainer 60 around the support shaft 23 are allowed while the relative displacement of the inserted engagement pin 51c in the front-rear direction is restricted. The right pin insertion hole 63 includes a hole portion 63a. The hole 63a is formed in the front-rear direction by the outer diameter of the engagement pin 51c such that the engagement pin 51c cannot be relatively displaced in the front-rear direction. Furthermore, the right pin insertion hole 63 may include a hole portion which is necessary for assembling the retainer 60 to the lid body 20 and is connected to the long hole portion 63a.

The engagement pin 51c is positioned in the hole portion 63a of the right pin insertion hole 63 in any of the right locked state (that is, including any of the closed state and the left open state of the lid body 20) and the right lock released state (that is, the right open state of the lid body 20). The right first rod 51 cannot be relatively displaced in the front-rear direction with respect to the right pin insertion hole 63 of the retainer 60 in the right locked state and the right lock released state, but the engagement pin 51c can rotate the retainer 60 around the support shaft 23 by pressing the rear surface of the hole portion 63a of the right pin insertion hole 63 rearwards.

Figure 11:
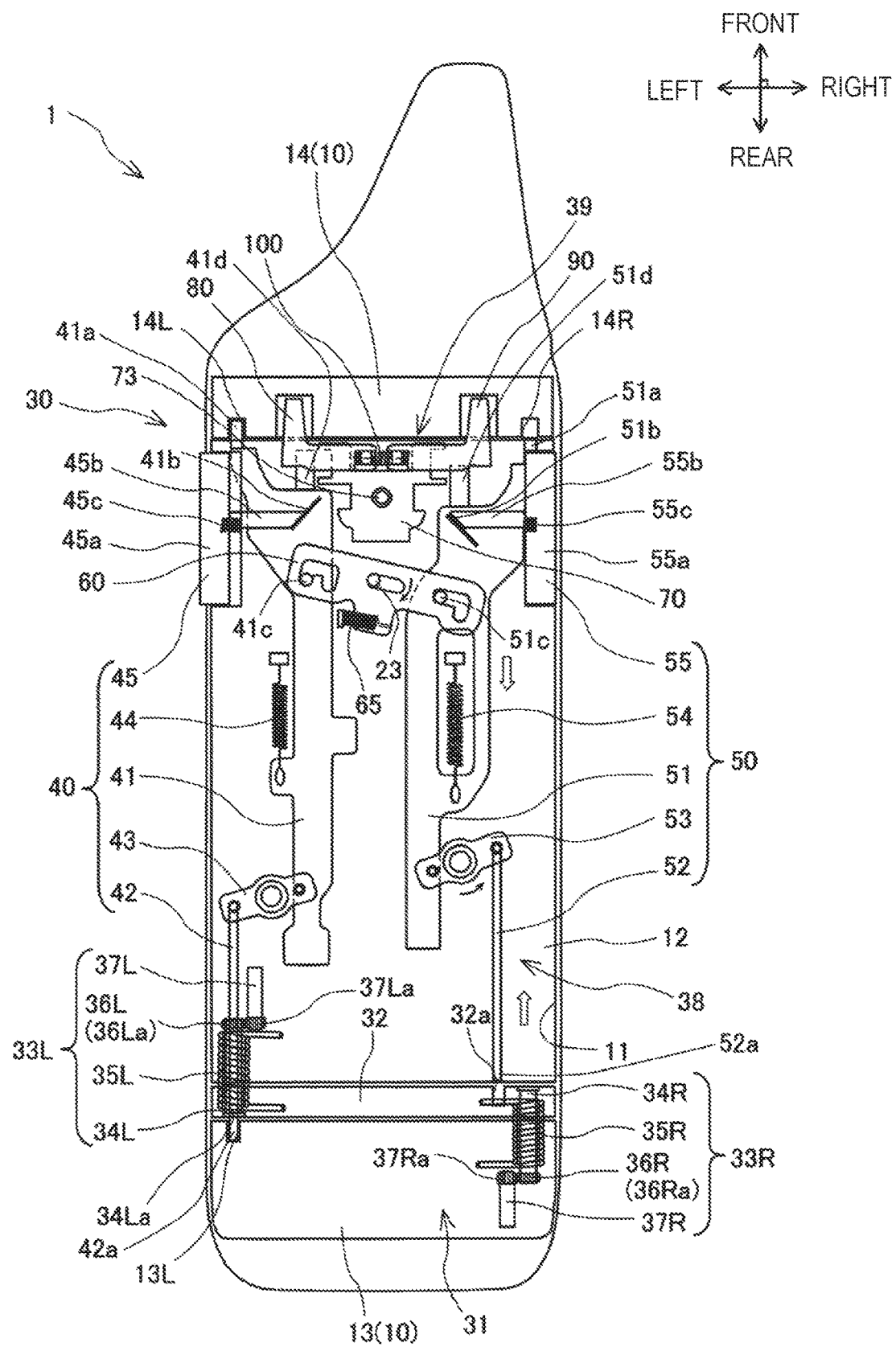
FIG. 11 is a configuration view illustrating the opening and closing mechanism included in the double opening storage device of the embodiment at the right open state of the lid body.

When the right first rod 51 is displaced rearwards and the right locking device 50 is in the right lock released state, as illustrated in FIG. 11, the engagement pin 51c of the right first rod 51 abuts against the rear surface of the hole portion 63a of the right pin insertion hole 63 of the retainer 60 and presses the right side of the retainer 60 rearwards, and accordingly, the retainer 60 rotates rightwards around the support shaft 23 when viewed from above. In this case, as the engagement pin 41c of the left first rod 41 is relatively displaced in the long hole portion 62a of the left pin insertion hole 62 of the retainer 60, the engagement pin 41c is positioned in the rear end portion of the long hole portion 62a. In other words, the engagement pin 41c is positioned in the rear end portion of the long hole portion 62a of the left pin insertion hole 62 even in the right lock released state, that is, in the right open state of the lid body 20 similar to a case in the left open state.

The retainer 60 is biased by the spring member 65 in a direction in which the closed state (that is, left locked state and right locked state) of the lid body 20 is realized. The spring member 65 extends substantially in the left-right direction. The spring member 65 applies the biasing force to the retainer 60 for positioning the engagement pin 41c in the front end portion of the long hole portion 62a of the left pin insertion hole 62 and for positioning the engagement pin 51c at a predetermined position at which the right locked state is realized.

Figure 12:
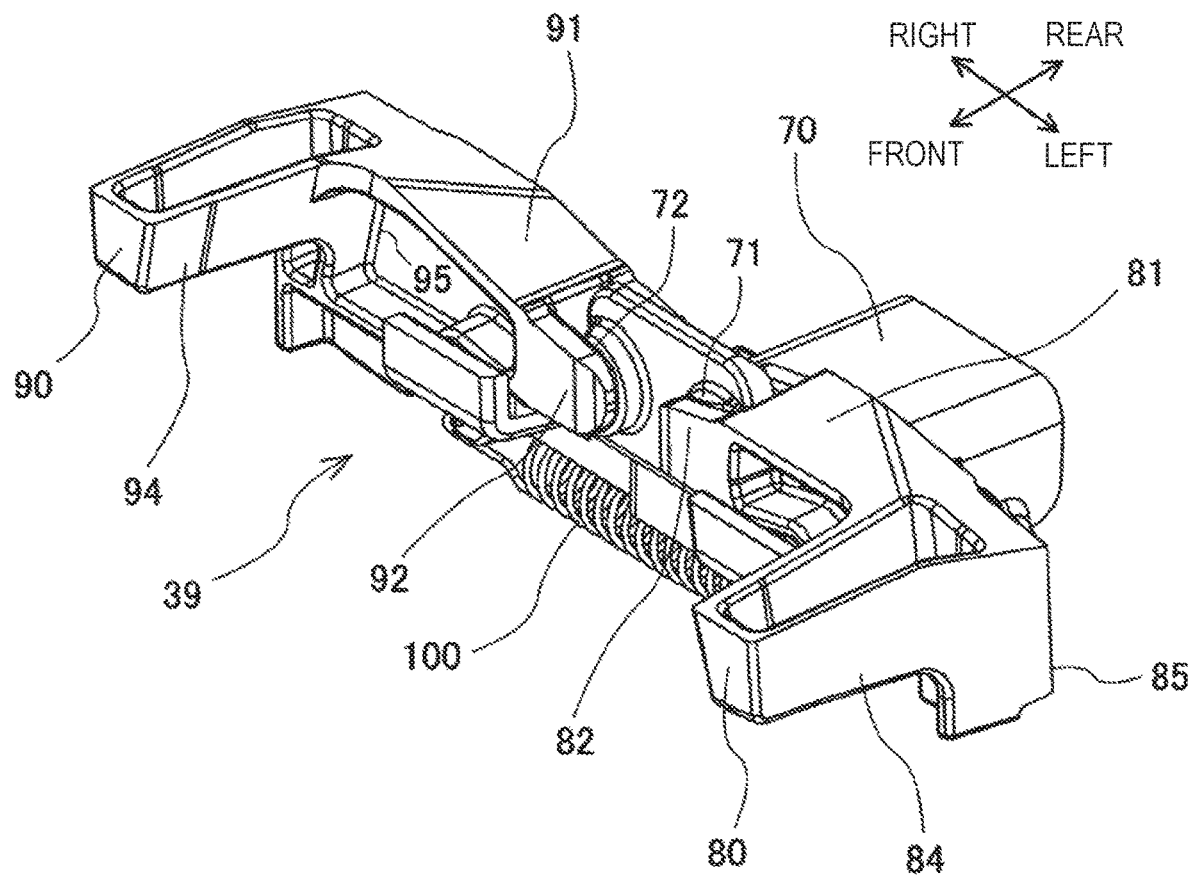
FIG. 12 is a perspective view illustrating a main part of a malfunction prevention device in the opening and closing mechanism included in the double opening storage device of the embodiment.

The base member 70 is a block-shaped member fixed to the bottom lid member 21 of the lid body 20 with a bolt 73 or the like. The base member 70 is attached to the center portion in the left-right direction of the lid body 20, and is disposed on the front end side of the lid body 20. As illustrated in FIG. 12, the base member 70 includes two shaft holes 71 and 72 that respectively extend in the front-rear direction. The two shaft holes 71 and 72 are disposed side by side in the left-right direction. The shaft hole 71 is a hole for rotatably supporting the left stopper 80. The shaft hole 72 is a hole for rotatably supporting the right stopper 90. The base member 70 rotatably supports the left stopper 80 and the right stopper 90, respectively.

The left stopper 80 is a member that restricts the forward displacement of the left first rod 41 in the left open state of the lid body 20 and the engagement of the box main body 10 with the front base portion 14 while the engagement of the left first rod 41 with the front base portion 14 of the box main body 10 in the left closed state of the lid body 20 is allowed. In other words, the left stopper 80 is a member that maintains the position of the left first rod 41 with respect to the lid body 20 or the retainer 60 to the releasing position at which the engagement with the engagement hole 14L is released when performing the pressing operation even when the pressing operation to the left operation unit 45 is released in the left open state of the lid body 20. The left stopper 80 is disposed on the left side with respect to the base member 70. The left stopper 80 includes a main body portion 81 and a shaft portion 82.

The main body portion 81 is a part that extends in a wing shape in the left-right direction. The shaft portion 82 is a cylindrical part that extends in the front-rear direction and is inserted into the shaft hole 71 of the base member 70. The shaft portion 82 is provided in the right end portion of the main body portion 81. The left stopper 80 is disposed in a state where the shaft portion 82 is inserted into the shaft hole 71 with respect to the base member 70.

In addition, the right stopper 90 is a member that restricts the forward displacement of the right first rod 51 in the right open state of the lid body 20 and the engagement of the box main body 10 with the front base portion 14 while the engagement of the right first rod 51 with the front base portion 14 of the box main body 10 in the right closed state of the lid body 20 is allowed. In other words, the right stopper 90 is a member that maintains the position of the right first rod 51 with respect to the lid body 20 or the retainer 60 to the releasing position at which the engagement with the engagement hole 14R is released when performing the pressing operation even when the pressing operation to the right operation unit 55 is released in the right open state of the lid body 20. The right stopper 90 is disposed on the right side opposite to the left stopper 80 with respect to the base member 70. The right stopper 90 includes a main body portion 91 and a shaft portion 92.

The main body portion 91 is a part that extends in a wing shape in the left-right direction. The shaft portion 92 is a cylindrical part that extends in the front-rear direction and is inserted into the shaft hole 72 of the base member 70. The shaft portion 92 is provided in the left end portion of the main body portion 91. The right stopper 90 is disposed in a state where the shaft portion 92 is inserted into the shaft hole 72 with respect to the base member 70.

Figure 13:
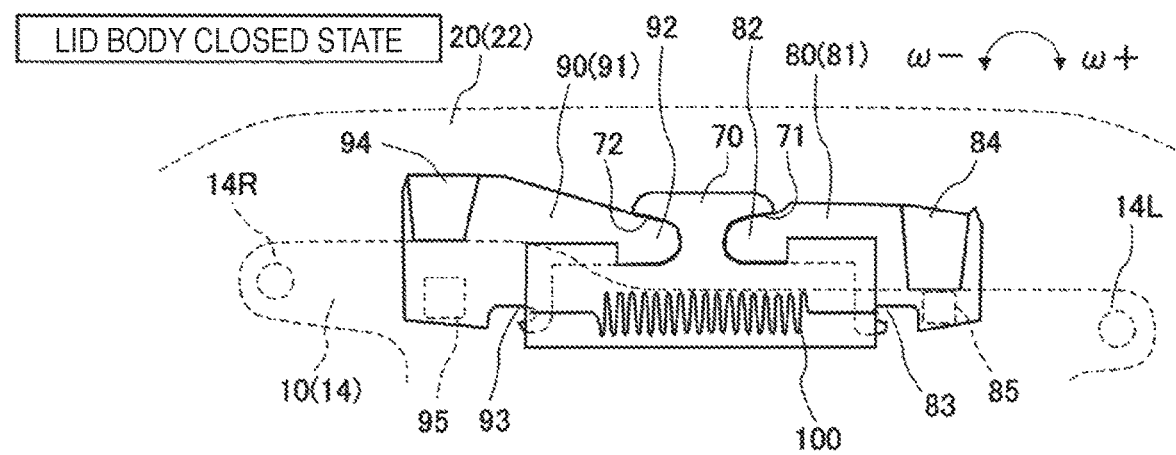
FIG. 13 is a view for describing an operation state of the malfunction prevention device included in the double opening storage device of the embodiment at a closed state of the lid body.

As illustrated in FIG. 13, the left stopper 80 and the right stopper 90 respectively include spring fixing portions 83 and 93 to which the end portion of the spring member 100 is fixed. At least one of the spring fixing portion 83 of the left stopper 80 and the spring fixing portion 93 of the right stopper 90 is provided at a position different from a position on the straight line that connects the centers of the shaft portions 82 and 92 in a state where the left stopper 80 and the right stopper 90 are respectively supported by the base member 70. Specifically, both the spring fixing portions 83 and 93 are provided under the main body portions 81 and 91.

One end of the spring member 100 is fixed to the spring fixing portion 83 of the left stopper 80. The other end of the spring member 100 is fixed to the spring fixing portion 93 of the right stopper 90. The spring member 100 is a member that generates the biasing force for rotating the left stopper 80 and the right stopper 90 in directions reverse to each other around the shaft portions 82 and 92. Specifically, the spring member 100 generates the biasing force for relatively pressing down the left portion side of the left stopper 80 with respect to the bottom lid member 21 by rotating the right stopper 80 in a clockwise direction w+ when viewed from the front around the shaft portion 82, and for relatively pressing down the right portion side of the right stopper 90 with respect to the bottom lid member 21 by rotating the right stopper 90 in a counterclockwise direction ω− when viewed from front around the shaft portion 92. Furthermore, the left stopper 80 and the right stopper 90 are respectively formed to include a pressing restricting unit for restricting the pressing by the biasing force of the spring member 100 at a predetermined position.

The left stopper 80 includes a rotation restricting unit 84. The rotation restricting unit 84 is a part for restricting the rotation of the left stopper 80 against the biasing force of the spring member 100 in the left closed state of the lid body 20 while the rotation of the left stopper 80 by the biasing force of the spring member 100 is allowed in the left open state of the lid body 20. The rotation restricting unit 84 is capable of abutting against the upper surface of the front base portion 14 of the box main body 10 and is formed to protrude forward from the main body portion 81.

Figure 14:
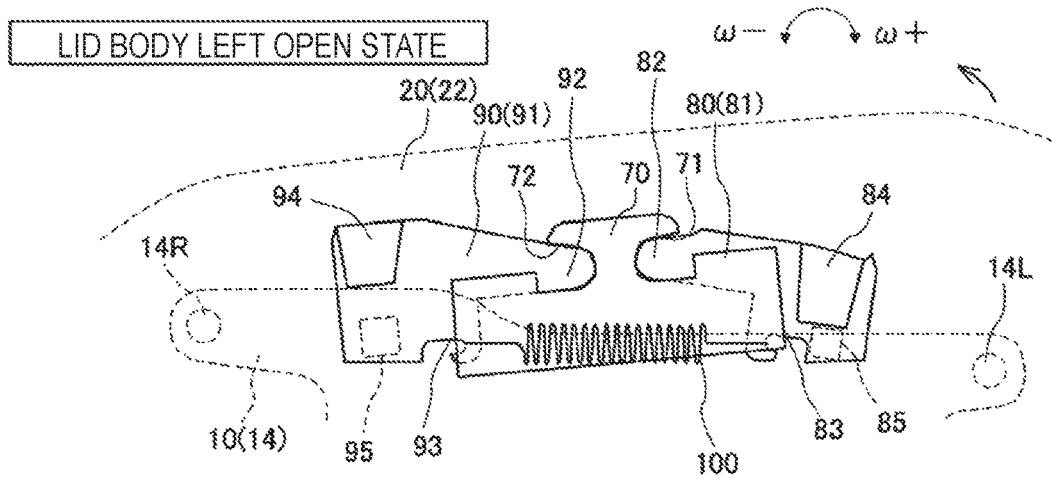
FIG. 14 is a view for describing an operation state of the malfunction prevention device included in the double opening storage device of the embodiment at the left open state of the lid body.

As illustrated in FIG. 13, when the lid body 20 is not in the left open state, that is, in the left closed state, the rotation restricting unit 84 abuts against the upper surface of the front base portion 14. In a state where the rotational restricting unit 84 abuts against the upper surface of the front base portion 14, the rotation of the left stopper 80 in the clockwise direction ω+, that is, the pressing with respect to the bottom lid member 21, is restricted by the biasing force of the spring member 100, and a rotating force in the counterclockwise direction ω− with respect to the lid body 20 against the biasing force of the spring member 100 is applied to the left stopper 80. Meanwhile, as illustrated in FIG. 14, when the lid body 20 is not in the left open state, the rotation restricting unit 84 is separated from the upper surface of the front base portion 14. When the rotation restricting unit 84 is separated from the upper surface of the front base portion 14, the left stopper 80 rotates in the clockwise direction ω+ by the biasing force of the spring member 100 and is pressed down with respect to the bottom lid member 21.

The left stopper 80 includes a displacement restricting unit 85. The displacement restricting unit 85 is a part that restricts the engagement between the left first rod 41 and the engagement hole 14L against the biasing force of the left rod biasing member 44 by abutting against the left first rod 41 in the left open state of the lid body 20 while the engagement between the left first rod 41 and the engagement hole 14L by the biasing force of the left rod biasing member 44 is allowed as not abutting against the left first rod 41 in the left closed state of the lid body 20. The displacement restricting unit 85 can abut against a restricting unit 41d provided at the front part of the left first rod 41, is integrally provided in the main body portion 81, and is formed to include a surface portion oriented rearwards.

Figure 15:
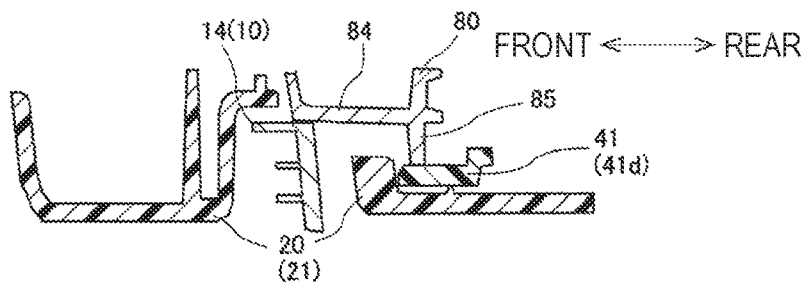
FIG. 15 is a sectional view illustrating the malfunction prevention device included in the double opening storage device of the embodiment when being cut along the line XV-XV illustrated in FIG. 8.

When the lid body 20 is not in the left open state, that is, in the left closed state, as illustrated in FIG. 15, since the left stopper 80 is not pressed down against the bottom lid member 21 by the rotation restriction by the rotation restricting unit 84, the displacement restricting the unit 85 is not positioned at a position at which the abutting against the restricting unit 41d of the left first rod 41 is possible. At this time, since the left first rod 41 is biased forward by the biasing force of the left rod biasing member 44 without abutting against the displacement restricting unit 85, the engagement between the left first rod 41 and the engagement hole 14L is allowed. Therefore, in the left closed state of the lid body, the left locked state is realized.

Figure 16:
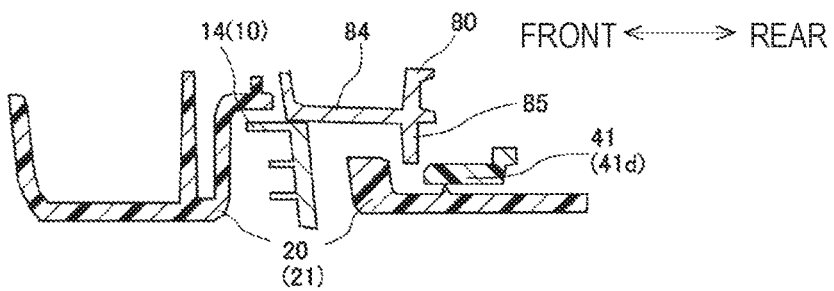
FIG. 16 is a sectional view of the malfunction prevention device included in the double opening storage device of the embodiment at the time of an opening operation to a left operation unit.
Figure 17:
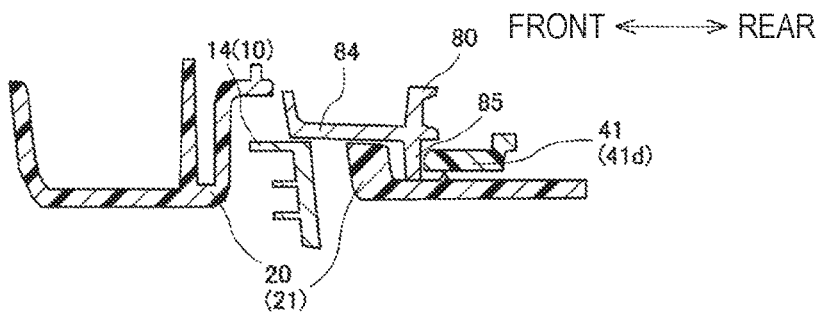
FIG. 17 is a sectional view illustrating the malfunction prevention device included in the double opening storage device of the embodiment when being cut along the line XVII-XVII illustrated in FIG. 10.

Meanwhile, when the left operation unit 45 is pressed rightward from the closed state of the lid body 20, first, as illustrated in FIG. 16, the left first rod 41 is displaced rearwards, and the restricting unit 41d is also displaced rearwards. In addition, when the engagement between the left first and second rods 41 and 42 and the box main body 10 is released and the left locking device 40 is in the left lock released state (that is, left open state), as illustrated in FIG. 17, since the rotation restriction by the rotation restricting unit 84 is released and the left stopper 80 is pressed down against the bottom lid member 21 by the biasing force of the spring member 100, the displacement restricting unit 85 is positioned at the position at which the abutting against the restricting unit 41d of the left first rod 41 is possible. At this time, even when the left first rod 41 is biased forward by the biasing force of the left rod biasing member 44, the left first rod 41 abuts against the displacement restricting unit 85 and cannot be further displaced, and thus, the engagement between the left first rod 41 and the engagement hole 14L is restricted.

Therefore, when the lid body 20 is once in the left open state by the rightward pressing operation with respect to the left operation unit 45, even when the pressing operation is released thereafter, in the left open state, the left first rod 41 is maintained at an engagement releasing position at the time of the pressing operation with respect to the lid body 20. In this case, even when the pressing operation to the left operation unit 45 is released, the engagement pin 41c of the left first rod 41 continues to be positioned in the rear end portion of the long hole portion 62a of the left pin insertion hole 62 of the retainer 60.

The right stopper 90 includes a rotation restricting unit 94. The rotation restricting unit 94 is a part for restricting the rotation of the right stopper 90 against the biasing force of the spring member 100 in the right closed state of the lid body 20 while the rotation of the right stopper 90 by the biasing force of the spring member 100 is allowed in the right open state of the lid body 20. The rotation restricting unit 94 is capable of abutting against the upper surface of the front base portion 14 of the box main body 10 and is formed to protrude forward from the main body portion 91.

When the lid body 20 is not in the right open state, that is, is in the right closed state, the rotation restricting unit 94 abuts on the upper surface of the front base portion 14. In a state where the rotational restricting unit 94 abuts against the upper surface of the front base portion 14, the rotation of the right stopper 90 in the counterclockwise direction ω−, that is, the pressing with respect to the bottom lid member 21, is restricted by the biasing force of the spring member 100, and the rotating force in the clockwise direction ω+ with respect to the lid body 20 against the biasing force of the spring member 100 is applied to the right stopper 90. Meanwhile, when the lid body 20 is in the right open state, the rotation restricting unit 94 is separated from the upper surface of the front base portion 14. When the rotation restricting unit 94 is separated from the upper surface of the front base portion 14, the right stopper 90 rotates in the counterclockwise direction ω− by the biasing force of the spring member 100 and is pressed down with respect to the bottom lid member 21.

The right stopper 90 includes a displacement restricting unit 95. The displacement restricting unit 95 is a part that restricts the engagement between the right first rod 51 and the engagement hole 14R against the biasing force of the right rod biasing member 54 by abutting against the right first rod 51 in the right open state of the lid body 20 while the engagement between the right first rod 51 and the engagement hole 14R by the biasing force of the right rod biasing member 54 is allowed as not abutting against the right first rod 51 in the right closed state of the lid body 20. The displacement restricting unit 95 can abut against a restricting unit 51d provided in front of the right first rod 51, is integrally provided in the main body portion 91, and is formed to include a surface portion oriented rearwards.

When the lid body 20 is not in the right open state, that is, is in the right closed state, since the right stopper 90 is not pressed down against the bottom lid member 21 by the rotation restriction by the rotation restricting unit 94, the displacement restricting unit 95 is not positioned at a position at which the abutting against the restricting unit 51d of the right first rod 51 is possible. At this time, since the right first rod 51 is biased forward by the biasing force of the right rod biasing member 54 without abutting against the displacement restricting unit 95, the engagement between the right first rod 51 and the engagement hole 14R is allowed. Therefore, in the right closed state of the lid body, the right locked state is realized.

Meanwhile, when the right operation unit 55 is pressed leftward from the closed state of the lid body 20, first, the right first rod 51 is displaced rearwards, and the restricting unit 51d is also displaced rearwards. In addition, when the engagement between the right first and second rods 51 and 52 and the box main body 10 or the arm member 32 is released and the right locking device 50 is in the right lock released state (that is, right open state), since the rotation restriction by the rotation restricting unit 94 is released and the right stopper 90 is pressed down against the bottom lid member 21 by the biasing force of the spring member 10X), the displacement restricting unit 95 is positioned at the position at which the abutting against the restricting unit 51d of the right first rod 51 is possible. At this time, even when the right first rod 51 is biased forward by the biasing force of the right rod biasing member 54, the right first rod 51 abuts against the displacement restricting unit 95 and cannot be further displaced, and thus, the engagement between the right first rod 51 and the engagement hole 14R is restricted.

Therefore, when the lid body 20 is once in the right open state by the leftward pressing operation with respect to the right operation unit 55, even when the pressing operation is released thereafter, in the right open state, the right first rod 51 is maintained at an engagement releasing position at the time of the pressing operation with respect to the lid body 20. In this case, even when the pressing operation to the right operation unit 55 is released, the engagement pin 41c of the left first rod 41 continues to be positioned in the rear end portion of the long hole portion 62a of the left pin insertion hole 62 of the retainer 60.

In the double opening storage device 1, in the closed state of the lid body 20, the left first rod 41 and the right first rod 51 are engaged with the front base portion 14 of the box main body 10, the left second rod 42 is engaged with the rear base portion 13 of the box main body 10 via the arm member 32, and the right second rod 52 is engaged with the arm member 32.

When the button portion 45a of the left operation unit 45 is pressed rightwards in the closed state of the above-described lid body 20, the pressing inclined surface of the mechanism portion 45b abuts against the engagement portion 41b of the left first rod 41, and the left first rod 41 is displaced rearwards. When the left first rod 41 is displaced rearwards, as the left synchronizing device 43 rotates rightwards, the left second rod 42 is displaced forward. When the rearward displacement of the left first rod 41 is performed until the engagement of the box main body 10 with the front base portion 14 is released and the forward displacement of the left second rod 42 is performed until the engagement of the box main body 10 with the rear base portion 13 is released, the left locking device 40 is in the left lock released state in a state where the right first rod 51 and the right second rod 52 are engaged with the front base portion 14 of the box main body 10 or the arm member 32 (that is, right locked state of the right locking device 50). In this case, while maintaining the right closed state of the lid body 20, the maintenance of the left closed state of the lid body 20 is released.

Furthermore, in the left locking device 40, it is desirable that the engagement releasing between the left first rod 41 and the front base portion 14 of the box main body 10 and the engagement releasing between the left second rod 42 and the rear base portion 13 of the box main body 10 are performed at substantially the same timing.

When the maintenance of the left closed state is released while the right closed state of the lid body 20 is maintained, while the lid body 20 does not swing with respect to the arm member 32, the arm member 32 swings with respect to the rear base portion 13 of the box main body 10 by the biasing force of the arm spring 35R of the right pivot support portion 33R. Therefore, in a case where the rightward pressing operation of the button portion 45a of the left operation unit 45 is performed, in a state where the lid body 20 is integrated with the arm member 32, the lid body 20 rotates around the right rotating shaft with respect to the box main body 10. Accordingly, the lid body 20 is in the left open state where the left side is opened toward the open position.

In addition, when the button portion 55a of the right operation unit 55 is pressed leftwards in the closed state of the above-described lid body 20, the pressing inclined surface of the mechanism portion 55b abuts against the engagement portion 51b of the right first rod 51, and the right first rod 51 is displaced rearwards. When the right first rod 51 is displaced rearwards, as the right synchronizing device 53 rotates leftwards, the right second rod 52 is displaced forward. When the rearward displacement of the right first rod 51 is performed until the engagement of the box main body 10 with the front base portion 14 is released and the forward displacement of the right second rod 52 is performed until the engagement with the arm member 32 is released, the right locking device 50 is in the right lock released state in a state where the left first rod 41 and the left second rod 42 are engaged with the front base portion 14 or the rear base portion 13 of the box main body 10 (that is, left locked state of the left locking device 40). In this case, while maintaining the left closed state of the lid body 20, the maintenance of the right closed state of the lid body 20 is released.

Furthermore, in the right locking device 50, it is desirable that the engagement releasing between the right first rod 51 and the front base portion 14 of the box main body 10 and the engagement releasing between the right second rod 52 and the arm member 32 are performed at substantially the same timing.

When the maintenance of the right closed state is released while the left closed state of the lid body 20 is maintained, while the arm member 32 does not swing with respect to the rear base portion 13 of the box main body 10, the lid body 20 swings with respect to the arm member 32 by the biasing force of the arm spring 35L of the left pivot support portion 33L. Therefore, in a case where the leftward pressing operation of the button portion 55a of the right operation unit 55 is performed, in a state where the arm member 32 is integrated with the box main body 10, the lid body 20 rotates around the left rotating shaft with respect to the arm portion 32 or the box main body 10. Accordingly, the lid body 20 is in the right open state where the right side is opened toward the open position.

In this manner, in the double opening storage device 1, the lid body 20 can enter the left open state around the right rotating shaft and can enter the right open state around the left rotating shaft from the closed state of covering the opening 11 of the box main body 10. After the lid body 20 is in the left open state or in the right open state, the lid body 20 is pressed downward with respect to the box main body 10 to rotate in a returning direction around the rotating shaft, thereby entering the closed state. Therefore, the lid body 20 can perform the opening and closing operation around any rotating shaft selected from between the right rotating shaft and the left rotating shaft.

In addition, in the double opening storage device 1, as described above, the opening and closing mechanism 30 includes the malfunction prevention device 39 that prevents the opening operation to the left operation unit 45 and the opening operation to the right operation unit 55 from being performed at the same time. The malfunction prevention device 39 includes the retainer 60 rotatably supported by the lid body 20, the pin insertion holes 62 and 63 provided in the retainer 60, and the engagement pins 41c and 51c provided in the rods 41 and 51.

The shape and the positional relationship between the left pin insertion hole 62 and the engagement pin 41c and the shape and the positional relationship between the right pin insertion hole 63 and the engagement pin 51c are set such that the engagement pin 41c of the left first rod 41 is positioned in the rear end portion of the long hole portion 62a of the left pin insertion hole 62 of the retainer 60 as the left first and second rods 41 and 42 are displaced in the releasing direction in which the engagement with the box main body 10 is released at the time of the opening operation to the left operation unit 45, and the engagement pin 41c of the left first rod 41 is positioned in the rear end portion of the long hole portion 62a of the left pin insertion hole 62 by the rotation of the entire retainer 60 around the support shaft 23 as the right first and second rods 51 and 52 are displaced in the releasing direction in which the engagement with the box main body 10 or the arm member 32 is released at the time of the opening operation to the right operation unit 55.

In such a structure, when any of the left locking device 40 and the right locking device 50 is in the lock released state by the opening operation of the left operation unit 45 or the right operation unit 55, the left first rod 41 is relatively displaced rearward with respect to the retainer 60, so that the engagement pin 41c of the left first rod 41 is positioned at the rear end portion of the long hole portion 62a of the left pin insertion hole 62 of the retainer 60, and the lid body 20 enters the left open state or the right open state. In other words, when the lid body 20 is in any of the left open state and the right open state, the engagement pin 41c of the left first rod 41 is positioned in the rear end portion of the long hole portion 62a of the left pin insertion hole 62 of the retainer 60.

The malfunction prevention device 39 further includes: the left stopper 80 that restricts the forward displacement of the left first rod 41 in the left open state of the lid body 20 and restricts the engagement with the engagement hole 14L of the front base portion 14 of the box main body 10; and the right stopper 90 that restricts the forward displacement of the right first rod 51 in the right open state of the lid body 20 and restricts the engagement with the engagement hole 14R of the front base portion 14 of the box main body 10.

In such a structure, when the lid body 20 is in the left open state, the forward displacement of the left first rod 41 is restricted by the left stopper 80 even after the pressing operation to the left operation unit 45 is released, and the engagement between the left first rod 41 and the engagement hole 14L and the engagement between the left second rod 42 and the engagement hole 13L by the biasing force of the left rod biasing member 44 are restricted. In addition, when the lid body 20 is in the right open state, even after the pressing operation to the right operation unit 55 is released, the forward displacement of the right first rod 51 is restricted by the right stopper 90, and the engagement between the right first rod 51 and the engagement hole 14R and the engagement between the right second rod 52 and the engagement hole 32a by the biasing force of the right rod biasing member 54 are restricted.

Therefore, when the lid body 20 is in the left open state, even after the pressing operation to the left operation unit 45 is released, since the engagement pin 41c of the left first rod 41 is positioned in the rear end portion of the long hole portion 62a of the left pin insertion hole 62 of the retainer 60, and the forward displacement of the left first rod 41 with respect to the lid body 20 and the retainer 60 is restricted by the left stopper 80, the engagement pin 41c is held at the rear end portion of the long hole portion 62a. In such a situation, even when the operator tries to rotate the retainer 60 rightwards around the support shaft 23 by performing the pressing operation to the right operation unit 55, since the engagement pin 41c cannot further be displaced rearward with respect to the long hole portion 62a of the insertion hole 62, it is possible to restrict the pressing operation to the right operation unit 55, and to prevent the rightward rotation of the retainer 60 and the forward and rearward displacements of the right first and second rods 51 and 52 from being allowed.

In addition, when the lid body 20 is in the right open state, even after the pressing operation to the right operation unit 55 is released, since the engagement pin 41c of the left first rod 41 is positioned in the rear end portion of the long hole portion 62a of the left pin insertion hole 62 of the retainer 60, and the forward displacement of the right first rod 51 with respect to the lid body 20 and the retainer 60 is restricted by the right stopper 90, the engagement pin 41c is held in the rear end portion of the long hole portion 62a. In such a situation, even when the operator tries to displace the left first rod 41 rearward with respect to the retainer 60 by performing the pressing operation to the left operation unit 45, since the engagement pin 41c cannot further be displaced rearward with respect to the long hole portion 62a of the left pin insertion hole 62, it is possible to restrict the pressing operation to the left operation unit 45, and to prevent the forward and rearward displacement of the left first and second rods 41 and 42 from being allowed.

In other words, in the left open state of the lid body 20, it is possible to restrict the forward and rearward displacements of the right first and second rods 51 and 52 by the pressing operation on the right operation unit 55, and to maintain the right locking device 50 in the right locked state, and in the right open state of the lid body 20, it is possible to restrict the forward and rearward displacements of the left first and second rods 41 and 42 by the pressing operation to the left operation unit 45, and to maintain the left locking device 40 in the left locked state. Therefore, it is possible to prevent the opening operation to the left operation unit 45 and the opening operation to the right operation unit 55 from being performed at the same time to prevent the lid body 20 from being in the left open state and the right open state simultaneously.

In addition, in the double opening storage device 1, the left stopper 80 and the right stopper 90 are assembled to the base member 70 which is a common component, and are biased to rotate in the directions reversed to each other by the spring member 100. In such a structure, with the mechanism that maintains the right locked state while the lid body 20 is in the left open state using the left stopper 80, and the mechanism that maintains the left locked state while the lid body 20 is in the right open state using the right stopper 90, the communization of components can be achieved. Therefore, it is possible to make the malfunction prevention device 39 compact. Therefore, the malfunction prevention device 39 can be disposed even in a narrow space of lid body 20, and in particular, the dimension in the left-right direction of the lid body 20 can be shortened.

Furthermore, the base member 70, the left stopper 80, the right stopper 90, and the spring member 100 are integrally assembled and unitized. According to the structure, it is possible to make it easy to handle the unit component after assembling the base member 70, the left stopper 80, the right stopper 90, and the spring member 100 and before incorporating the members into the double opening storage device 1, and to facilitate the work of incorporating the unit component into the storage device 1.

Furthermore, when the lid body 20 is pressed downward with respect to the box main body 10 to be in the closed state from the left open state, the rotation restricting unit 84 of the left stopper 80 abuts against the upper surface of the front base portion 14 in the middle of the process, and after this, the left stopper 80 is rotated in the counterclockwise direction ω− with respect to the lid body 20 against the biasing force of the spring member 100 and is pressed upward with respect to the bottom lid member 21. In this case, since the abutting between the left first rod 41 and the displacement restricting unit 85 of the left stopper 80 is released and the left first rod 41 is biased forward by the biasing force of the left rod biasing member 44, the left first rod 41 and the engagement hole 14L are engaged with each other and the left locking device 40 enters the locked state.

In addition, when the lid body 20 is pressed downward with respect to the box main body 10 to be in the closed state from the right open state, the rotation restricting unit 94 of the right stopper 90 abuts against the upper surface of the front base portion 14 in the middle of the process, and after this, the right stopper 90 is rotated in the clockwise direction ω+ with respect to the lid body 20 against the biasing force of the spring member 100 and is pressed upward with respect to the bottom lid member 21. In this case, since the abutting between the right first rod 51 and the displacement restricting unit 95 of the right stopper 90 is released and the right first rod 51 is biased forward by the biasing force of the right rod biasing member 54, the right first rod 51 and the engagement hole 14R are engaged with each other and the right locking device 50 enters the locked state.

The double opening storage device 1 of the embodiment includes: the box main body 10 including the accommodation unit 12 provided with the opening 11; the lid body 20 that covers the opening 11 to be openable and closable; and the opening and closing mechanism 30 that opens and closes the lid body 20 around the rotating shaft selected from between the left rotating shaft and the right rotating shaft that respectively extend in the front-rear direction along the peripheral edge of the opening 11. The opening and closing mechanism 30 includes: the left first and second rods 41 and 42 that are disposed in the lid body 20 to correspond to the left rotating shaft and are displaced to be engageable with the box main body 10; the right first and second rods 51 and 52 that are disposed in the lid body 20 to correspond to the right rotating shaft and are displaced to be engageable with the box main body 10; the engagement holes 14L and 13L that are provided in the box main body 10 to correspond to the left first and second rods 41 and 42 and are engageable with the tip ends of the rods 41 and 42; the engagement holes 14R and 32a that are provided in the box main body 10 or the arm member 32 to correspond to the right first and second rods 51 and 52 and are engageable with the tip ends of the rods 51 and 52; the left rod biasing member 44 that generates the biasing force for engaging the left first and second rods 41 and 42 with the engagement holes 14L and 13L; the right rod biasing member 54 that generates the biasing force for engaging the right first and second rods 51 and 52 with the engagement holes 14R and 32a; the left operation unit 45 that displaces the left first and second rods 41 and 42 in the releasing direction in which the engagement with the engagement holes 14L and 13L is released against the biasing force of the left rod biasing member 44 by the opening operation; the right operation unit 55 that displaces the right first and second rods 51 and 52 in the releasing direction in which the engagement with the engagement holes 14R and 32a is released against the biasing force of the right rod biasing member 54 by the opening operation; and the malfunction prevention device 39 that prevents the displacement of the left first and second rods 41 and 42 to the left operation unit 45 by the opening operation and the displacement of the right first and second rods 51 and 52 to the right operation unit 55 by the opening operation from being performed at the same time. The malfunction prevention device 39 includes: the base member 70 that is attached to the center portion in the left-right direction of the lid body 20; the left stopper 80 that is disposed on the left side with respect to the base member 70 and is rotatable around the shaft portion 82 that extends in the front-rear direction with respect to the base member 70; the right stopper 90 that is disposed on the right side with respect to the base member 70 and is rotatable around the shaft portion 92 that extends in the front-rear direction with respect to the base member 70; and the spring member 100 which includes one end fixed to the left stopper 80 and the other end fixed to the right stopper 90, and which generates the biasing force that rotates the left stopper 80 in the clockwise direction ω+ around the shaft portion 82 and the right stopper 90 in the counterclockwise direction ω− around the shaft portion 92. The left stopper 80 includes: the rotation restricting unit 84 that restricts the rotation of the left stopper 80 in the clockwise direction ω+ due to the biasing force of the spring member 100 by abutting against the box main body 10 when the lid body 20 is in the left closed state; and the displacement restricting unit 85 that restricts the displacement of the left first rod 41 in the forward direction to be engaged with the engagement hole 14L against the biasing force of the left rod biasing member 44 by abutting against the tip end surface of the left first rod 41 in a state where the left stopper 80 rotates in the clockwise direction ω+ due to the biasing force of the spring member 100 when the lid body 20 is in the left open state. The right stopper 90 includes: the rotation restricting unit 94 that restricts the rotation of the right stopper 90 in the counterclockwise direction ω− against the biasing force of the spring member 100 by abutting against the box main body 10 when the lid body 20 is in the right closed state; and the displacement restricting unit 95 that restricts the displacement of the right first rod 51 in the forward direction to be engaged with the engagement hole 14R against the biasing force of the right rod biasing member 54 by abutting against the tip end surface of the right first rod 51 in a state where the right stopper 90 rotates in the counterclockwise direction ω− due to the biasing force of the spring member 100 when the lid body 20 is in the right open state.

According to the configuration, it is possible to prevent the opening operation to the left operation unit 45 and the opening operation to the right operation unit 55 from being performed at the same time by using the base member 70, the left stopper 80, the right stopper 90, and the spring member 100 to prevent the lid body 20 from being in the left open state and the right open state simultaneously. In addition, since the common base member 70 and the spring member 100 are used to prevent the opening operation to the left operation unit 45 and the opening operation to the right operation unit 55 from being performed at the same time, it is possible to make the malfunction prevention device 39 compact.

In addition, in the double opening storage device 1, the base member 70, the left stopper 80, the right stopper 90, and the spring member 100 are integrally unitized. Therefore, it is possible to facilitate the handling of the unit component, and it is possible to facilitate the work of incorporating the unit component into the double opening storage device 1.

In addition, in the double opening storage device 1, the malfunction prevention device 39 includes: the retainer 60 that is rotatably supported around the support shaft 23 in the lid body 20; the engagement pin 41c provided in the left first rod 41; the left pin insertion hole 62 which is provided in the retainer 60 and into which the engagement pin 41c is inserted in a state of being allowed to be relatively displaced in the front-rear direction; the engagement pin 51c that is provided in the right second rod 51; and the right pin insertion hole 63 which is provided in the retainer 60 and into which the engagement pin 51c is inserted in a state of being allowed to relatively rotate around the own shaft while relative displacement in the front-rear direction is restricted. When the right first rod 51 is displaced in the releasing direction due to the opening operation to the right operation unit 55, the retainer 60 rotates around the support shaft 23. The pin insertion holes 62 and 63 are formed to restrict the displacement of the right first rod 51 in the releasing direction due to the opening operation to the right operation unit 55 in a case where the engagement pin 41c is positioned in the rear end portion of the long hole portion 62a in the left pin insertion hole 62 as the left first rod 41 is displaced in the releasing direction by the opening operation to the left operation unit 45, and to restrict the displacement of the left first rod 41 in the releasing direction due to the opening operation to the left operation unit 45 in a case where the engagement pin 41c is positioned in the rear end portion of the long hole portion 62a in the left pin insertion hole 62 by the rotation of the retainer 60 as the right first rod 51 is displaced in the releasing direction by the opening operation to the right operation unit 55.

According to the configuration, it is possible to prevent the opening operation to the left operation unit 45 and the opening operation to the right operation unit 55 from being performed at the same time, thereby preventing the lid body 20 from being in the left open state and being in the right open state simultaneously.

Furthermore, in the double opening storage device 1, the left pin insertion hole 62 includes the long hole portion 62a that extends in the front-rear direction such that the engagement pin 41c can be relatively displaced in the front-rear direction by the displacement of the left first rod 41. The right pin insertion hole 63 includes the hole portion 63a formed in the front-rear direction by the outer diameter of the engagement pin 51c such that the engagement pin 51c cannot be relatively displaced in the front-rear direction. According to the configuration, in order to prevent the opening operation to the left operation unit 45 and the opening operation to the right operation unit 55 from being performed at the same time, since it is possible to make the displacement of the left first rod 41 with respect to the retainer 60 to be common while changing the movement of the retainer 60 between both of the opening operations, it is possible to make the configuration compact.

Furthermore, in the above-described embodiment, the left first rod 41 and the left second rod 42 correspond to "first rod" described in the claims, the right first rod 51 and the right second rod 52 correspond to "second rod" described in the claims, the engagement holes 14L and 13L correspond to "first engagement hole" described in the claims, the engagement holes 14R and 32a correspond to "second engagement hole" described in the claims, the left rod biasing member 44 corresponds to "first biasing member" described in the claims, the right rod biasing member 54 corresponds to "second biasing member" described in the claims, the left operation unit 45 corresponds to "first operation unit" described in the claims, the right operation unit 55 corresponds to "second operation unit" described in the claims, the left stopper 80 corresponds to "first stopper" described in the claims, the right stopper 90 corresponds to "second stopper" described in the claims, the spring member 100X) corresponds to "spring member" described in the claims, the rotation restricting unit 84 corresponds to "first rotation restricting unit" described in the claims, the displacement restricting unit 85 corresponds to "first displacement restricting unit" described in the claims, the rotation restricting unit 94 corresponds to "second rotation restricting unit" described in the claims, the displacement restricting unit 95 corresponds to "second displacement restricting unit" described in the claims, the engagement pin 41c corresponds to "first pin" described in the claims, the left pin insertion hole 62 corresponds to "first pin insertion hole" described in the claims, the engagement pin 51c corresponds to "second pin" described in the claims, and the right pin insertion hole 63 corresponds to "second pin insertion hole" described in the claims, respectively.

Incidentally, in the above-described embodiment, the retainer 60 is provided with the pin insertion holes 62 and 63 and the rods 41 and 51 are provided with the engagement pins 41c and 51c engaged with the pin insertion holes 62 and 63. However, the invention is not limited thereto, and on the contrary, the pin insertion hole may be provided in the rods 41 and 51 and the engagement pin engaged with the pin insertion hole may be provided in the retainer 60.

Furthermore, the invention is not limited to the above-described embodiments, and various modifications can be made without departing from the spirit of the invention.

What is claimed is:
1. A double opening storage device comprising:
a box main body including an accommodation unit provided with an opening;
a lid body that covers the opening to be openable and closable; and
an opening and closing mechanism that makes the lid body perform an opening and closing operation around a rotating shaft selected from between a first rotating shaft and a second rotating shaft which respectively extend in a front-rear direction along a peripheral edge of the opening, wherein:
the opening and closing mechanism includes:
a first rod that is disposed in the lid body to correspond to the first rotating shaft and is displaced to be engageable with the box main body side;
a second rod that is disposed in the lid body to correspond to the second rotating shaft and is displaced to be engageable with the box main body side;
a first engagement hole that is provided on the box main body side to correspond to the first rod and is engageable with a tip end of the first rod;
a second engagement hole that is provided on the box main body side to correspond to the second rod and is engageable with a tip end of the second rod;
a first biasing member that generates a biasing force for engaging the first rod with the first engagement hole;
a second biasing member that generates a biasing force for engaging the second rod with the second engagement hole;
a first operation unit that displaces the first rod in a releasing direction in which the engagement with the first engagement hole is released against the biasing force of the first biasing member by an opening operation;
a second operation unit that displaces the second rod in a releasing direction in which the engagement with the second engagement hole is released against the biasing force of the second biasing member by an opening operation; and
a malfunction prevention device that prevents the displacement of the first rod due to the opening operation to the first operation unit and the displacement of the second rod due to the opening operation to the second operation unit from being performed at the same time;
the malfunction prevention device includes:
a base member that is attached to a center portion in a left-right direction of the lid body;
a first stopper that is disposed on a left side with respect to the base member and is rotatable around a first shaft extending in a front-rear direction with respect to the base member;
a second stopper that is disposed on a right side with respect to the base member and is rotatable around a second shaft extending in the front-rear direction with respect to the base member; and
a spring member which includes one end fixed to the first stopper and the other end fixed to the second stopper, and which generates a biasing force for rotating the first stopper in a first rotating direction around the first shaft and for rotating the second stopper in a second rotating direction around the second shaft;
the first stopper includes:
a first rotation restricting unit that restricts rotation of the first stopper in the first rotating direction due to the biasing force of the spring member by abutting against the box main body when the lid body is not in a left open state; and a first displacement restricting unit that restricts displacement of the first rod in a direction to be engaged with the first engagement hole against the biasing force of the first biasing member by abutting against a tip end surface of the first rod in a state where the first stopper rotates in the first rotating direction due to the biasing force of the spring member when the lid body is in the left open state; and the second stopper includes:

a second rotation restricting unit that restricts rotation of the second stopper in the second rotating direction against the biasing force of the spring member by abutting against the box main body when the lid body is not in a right open state; and a second displacement restricting unit that restricts displacement of the second rod in a direction to be engaged with the second engagement hole against the biasing force of the second biasing member by abutting against a tip end surface of the second rod in a state where the second stopper rotates in the second rotating direction due to the biasing force of the spring member when the lid body is in the right open state.

2. The double opening storage device according to claim 1, wherein
the base member, the first stopper, the second stopper, and the spring member are unitized.

3. The double opening storage device according to claim 1, wherein:
the malfunction prevention device includes:
a retainer that is rotatably supported around a support shaft in the lid body;
a first pin provided in any one of the first rod and the retainer;
a first pin insertion hole which is provided in the other one of the first rod and the retainer, and into which the first pin is inserted in a state of being allowed to be relatively displaced in the front-rear direction;
a second pin that is provided in any one of the second rod and the retainer; and
a second pin insertion hole which is provided in the other one of the second rod or the retainer, and into which the second pin is inserted in a state of being allowed to relatively rotate around an own shaft while relative displacement in the front-rear direction is restricted;

the retainer rotates around the support shaft when the second rod is displaced in the releasing direction due to the opening operation to the second operation unit; and the first pin insertion hole and the second insertion hole are formed to restrict the displacement of the second rod in the releasing direction due to the opening operation to the second operation unit in a case where the first pin is positioned at a predetermined position in the first pin insertion hole as the first rod is displaced in the releasing direction due to the opening operation to the first operation unit, and to restrict the displacement of the first rod in the releasing direction due to the opening operation to the first operation unit in a case where the first pin is positioned at the predetermined position due to the rotation of the retainer as the second rod is displaced in the releasing direction due to the opening operation to the second operation unit.

4. The double opening storage device according to claim 3, wherein:
the first pin insertion hole extends in the front-rear direction such that the first pin is relatively displaceable by the displacement of the first rod in the front-rear direction; and
the second pin insertion hole is correlated to an outer diameter of the second pin in the front-rear direction such that the second pin is not relatively displaceable in the front-rear direction.

* * * * *